United States Patent
Inoishi

(10) Patent No.: US 8,542,382 B2
(45) Date of Patent: Sep. 24, 2013

(54) COMMUNICATING APPARATUS AND COMMUNICATING SYSTEM

(75) Inventor: Hideki Inoishi, Fukushima (JP)

(73) Assignee: Oki Data Corporation, Tokyo (JP)

( * ) Notice: Subject to any disclaimer, the term of this patent is extended or adjusted under 35 U.S.C. 154(b) by 1211 days.

(21) Appl. No.: 12/219,887

(22) Filed: Jul. 30, 2008

(65) Prior Publication Data

US 2009/0051965 A1 Feb. 26, 2009

(30) Foreign Application Priority Data

Aug. 22, 2007 (JP) ................................. 2007-215834

(51) Int. Cl.
- *H04N 7/00* (2011.01)
- *H04N 1/04* (2006.01)
- *H04N 1/00* (2006.01)
- *G06F 3/12* (2006.01)
- *G06K 9/46* (2006.01)

(52) U.S. Cl.
USPC .......... 358/1.15; 358/400; 358/474; 358/434; 382/236

(58) Field of Classification Search
USPC ................. 358/400, 1.15, 474, 434; 382/236
See application file for complete search history.

(56) References Cited

U.S. PATENT DOCUMENTS

| | | | | |
|---|---|---|---|---|
| 5,124,809 A | * | 6/1992 | Koishikawa | 358/400 |
| 6,307,642 B1 | * | 10/2001 | Watanabe et al. | 358/1.15 |
| 6,535,303 B1 | * | 3/2003 | Wolf | 358/434 |
| 6,594,396 B1 | * | 7/2003 | Yoshida et al. | 382/236 |
| 2002/0051243 A1 | * | 5/2002 | Yoshida | 358/474 |

FOREIGN PATENT DOCUMENTS

JP 2001-238057 * 8/2001

* cited by examiner

*Primary Examiner* — Akwasi M Sarpong
(74) *Attorney, Agent, or Firm* — Rabin & Berdo, P.C.

(57) ABSTRACT

A communicating apparatus is supplied capable of maintaining a receiving corresponding to high communication capability for receiving from all partner apparatuses; reducing the cost of apparatus; and eliminating dependence on an exchange machine. In the communicating apparatus, a sending and receiving controlling section, when communicatively connected with a sending side communicating apparatus via telephone line, sends a first DIS signal generated by a signal generating section to the sending side communicating apparatus; a DCS judging portion judges whether received or not a DCS signal corresponding to the first DIS signal from the sending side communicating apparatus, if it is not received, sends a second DIS signal of high communication capability to partner apparatus; the sending and receiving controlling section sends CFR signal which represents that it has been confirmed to execute communication process in the communication capability notified by the DCS signal from partner apparatus with respect to the first DIS signal or the second DIS signal; then, receives image data from the sending side communicating apparatus.

6 Claims, 20 Drawing Sheets

| BIT NUMBER | DIS / DTC | NOTE | DCS | NOTE |
|---|---|---|---|---|
| 1 | STORE AND FORWARD INTERNET FAX-SIMPLE MODE (ITU-T Rec. T. 37) | 60, 63 | STORE AND FORWARD INTERNET FAX-SIMPLE MODE (ITU-T Rec. T. 37) | 60, 63 |
| 2 | RESERVED | 1 | RESERVED | 1 |
| 3 | REAL-TIME INTERNET FAX (ITU-T Rec. T. 38) | 61, 63 | REAL-TIME INTERNET FAX (ITU-T Rec. T. 38) | 61, 63 |
| 4 | 3RD GENERATION MOBILE NETWORK | 71 | 3RD GENERATION MOBILE NETWORK | 71 |
| 5 | RESERVED | 1 | RESERVED | 1 |
| 6 | V. 8 CAPABILITIES | 23 | INVALID | 24 |
| 7 | "0"=256 OCTETS PREFERRED "1"=64 OCTETS PREFERRED | 23, 42 | INVALID | 24 |
| 8 | RESERVED | 1 | RESERVED | 1 |
| 9 | READY TO TRANSMIT A FACSIMILE DOCUMENT (POLLING) | 18 | SET TO "0" | |
| 10 | RECEIVER FAX OPERATION | 19 | RECEIVER FAX OPERATION | 20 |
| 11, 12, 13, 14<br>0, 0, 0, 0<br>0, 1, 0, 0<br>1, 0, 0, 0<br>1, 1, 0, 0<br>0, 0, 1, 0<br>0, 1, 1, 0<br>1, 0, 1, 0<br>1, 1, 1, 0<br>0, 0, 0, 1<br>0, 1, 0, 1<br>1, 0, 0, 1<br>1, 1, 0, 1<br>0, 0, 1, 1<br>0, 1, 1, 1<br>1, 0, 1, 1<br>1, 1, 1, 1 | DATA SIGNALLING RATE<br>ITU-T Rec. V. 27 ter FALL-BACK MODE<br>ITU-T Rec. V. 27 ter<br>ITU-T Rec. V. 29<br>ITU-T Recs V. 27 ter AND V. 29<br>NOT USED<br>RESERVED<br>NOT USED<br>INVALID<br>NOT USED<br>RESERVED<br>NOT USED<br>ITU-T Recs V. 27 ter, V. 29 AND V. 17<br>NOT USED<br>RESERVED<br>NOT USED<br>RESERVED | <br><br><br>3<br><br><br><br><br><br>32<br><br><br><br>31 | DATA SIGNALLING RATE<br>2400 bit / s, ITU-T Rec. V. 27 ter<br>4800 bit / s, ITU-T Rec. V. 27 ter<br>9600 bit / s, ITU-T Rec. V. 29<br>7200 bit / s, ITU-T Rec. V. 29<br>INVALID<br>INVALID<br>RESERVED<br>RESERVED<br>14400 bit / s, ITU-T Rec. V. 17<br>12000 bit / s, ITU-T Rec. V. 17<br>9600 bit / s, ITU-T Rec. V. 17<br>7200 bit / s, ITU-T Rec. V. 17<br>RESERVED<br>RESERVED<br>RESERVED<br>RESERVED | 33<br><br><br><br>31<br>31 |
| 15 | R8 × 7.7 LINES / mm AND / OR 200 × 200 PELS / 25.4mm | 10, 11, 13, 25, 34 | R8 × 7.7 LINES / mm OR 200 × 200 PELS / 25.4mm | 10, 11, 13, 25, 34 |
| 16 | TWO-DIMENSIONAL CODING CAPABILITY | | TWO-DIMENSIONAL CODING | |

*FIG. 3A*

| BIT NUMBER | DIS / DTC | NOTE | DCS | NOTE |
|---|---|---|---|---|
| 17, 18 | RECORDING WIDTH CAPABILITIES | 27 | RECORDING WIDTH | 27 |
| 0, 0 | SCAN LINE LENGTH 215mm±1% | | SCAN LINE LENGTH 215mm±1% | |
| 0, 1 | SCAN LINE LENGTH 215mm±1% AND SCAN LINE LENGTH 255mm±1% AND SCAN LINE LENGTH 303mm±1% | | SCAN LINE LENGTH 303mm±1% | |
| 1, 0 | SCAN LINE LENGTH 215mm±1% AND SCAN LINE LENGTH 255mm±1% | | SCAN LINE LENGTH 255mm±1% | |
| 1, 1 | INVALID | 6 | INVALID | |

*FIG. 3B*

| BIT NUMBER | DIS / DTC | NOTE | DCS | NOTE |
|---|---|---|---|---|
| 19, 20<br>0, 0<br>0, 1<br>1, 0<br>1, 1 | RECORDING LENGTH CAPABILITY<br>A4 (297mm)<br>UNLIMITED<br>A4 (297mm) AND B4 (364mm)<br>INVALID | 2 | RECORDING LENGTH<br>A4 (297mm)<br>UNLIMITED<br>B4 (364mm)<br>INVALID | 2 |
| 21, 22, 23<br><br>0, 0, 0<br>0, 0, 1<br>0, 1, 0<br>1, 0, 0<br>0, 1, 1<br>1, 1, 0<br>1, 0, 1<br>1, 1, 1 | MINIMUM SCAN LINE TIME CAPABILITY AT THE RECEIVER<br>20 ms at 3.85 l/mm:$T_{7.7}=T_{3.85}$<br>40 ms at 3.85 l/mm:$T_{7.7}=T_{3.85}$<br>10 ms at 3.85 l/mm:$T_{7.7}=T_{3.85}$<br>5 ms at 3.85 l/mm:$T_{7.7}=T_{3.85}$<br>10 ms at 3.85 l/mm:$T_{7.7}=1/2T_{3.85}$<br>20 ms at 3.85 l/mm:$T_{7.7}=1/2T_{3.85}$<br>40 ms at 3.85 l/mm:$T_{7.7}=1/2T_{3.85}$<br>0 ms at 3.85 l/mm:$T_{7.7}=T_{3.85}$ | 4, 8, 23 | MINIMUM SCAN LINE TIME<br><br>20 ms<br>40 ms<br>10 ms<br>5 ms<br><br><br><br>0ms | 8, 24 |
| 24 | EXTEND FIELD | 5 | EXTEND FIELD | 5 |
| 25 | RESERVED | 1, 41 | RESERVED | 1, 41 |
| 26 | UNCOMPRESSED MODE | | UNCOMPRESSED MODE | |
| 27 | ERROR CORRECTION MODE | 17 | ERROR CORRECTION MODE | 17 |
| 28 | SET TO "0" | | FRAME SIZE 0 = 256 octets<br>FRAME SIZE 1 = 64 octets | 7<br>24 |
| 29 | RESERVED | 1 | RESERVED | 1 |
| 30 | RESERVED | 1 | RESERVED | 1 |
| 31 | T. 6 CODING CAPABILITY | 9, 17 | T. 6 CODING ENABLED | 9, 17 |
| 32 | EXTEND FIELD | 5 | EXTEND FIELD | 5 |
| 33 | FIELD NOT VALID CAPABILITY | | FIELD NOT VALID CAPABILITY | |
| 34 | MULTIPLE SELECTIVE POLLING CAPABILITY | 52 | SET TO "0" | |
| 35 | POLLED SUBADDRESS | 26, 44, 45 | SET TO "0" | |
| 36 | T. 43 CODING | 17, 25, 34, 35, 37, 39, 40 | T. 43 CODING | 17, 25, 34, 35, 37, 39, 40 |
| 37 | PLANE INTERLEAVE | 25, 46 | PLANE INTERLEAVE | 25, 46 |

*FIG. 4A*

| BIT NUMBER | DIS / DTC | NOTE | DCS | NOTE |
|---|---|---|---|---|
| 38 | VOICE CODING WITH 32 k ADPCM ( ITU-T Rec. G.726) | 58, 59 | VOICE CODING WITH 32 k ADPCM ( ITU-T Rec. G.726) | 17, 58, 59 |
| 39 | RESERVED FOR THE USE OF EXTENDED VOICE CODING | 1 | RESERVED FOR THE USE OF EXTENDED VOICE CODING | 1 |
| 40 | EXTEND FIELD | 5 | EXTEND FIELD | 5 |
| 41 | R8 × 15.4 LINES/mm | 10, 62 | R8 × 15.4 LINES/mm | 10, 62 |
| 42 | 300 × 300 PELS/25.4mm | 34, 80 | 300 × 300 PELS/25.4mm | 34 |
| 43 | R16 × 15.4 LINES/mm AND/OR 400 × 400 PELS/25.4mm | 10, 12, 13, 34, 80 | R16 × 15.4 LINES/mm AND/OR 400 × 400 PELS/25.4mm | 10, 12, 13, 34 |

*FIG. 4B*

| BIT NUMBER | DIS / DTC | NOTE | DCS | NOTE |
|---|---|---|---|---|
| 44 | INCH-BASED RESOLUTION PREFERRED | 13, 14 | RESOLUTION-TYPE SELECTION<br>"0": METRIC-BASED RESOLUTION<br>"1": INCH-BASED RESOLUTION | 13, 14 |
| 45 | METRIC-BASED RESOLUTION PREFERRED | 13, 14 | DON'T CARE | |
| 46 | MINIMUM SCAN LINE TIME CAPABILITY FOR HIGHER RESOLUTIONS<br>"0" : T15.4 = T7.7<br>"1" : T15.4 = 1/2 T7.7 | 15 | DON'T CARE | |
| 47 | SELECTIVE POLLING | 26, 44 | SET TO "0" | |
| 48 | EXTEND FIELD | 5 | EXTEND FIELD | 5 |
| 49 | SUBADDRESSING CAPABILITY | | SUBADDRESSING TRANSMISSION | 26 |
| 50 | PASSWORD | 26 | SENDER IDENTIFICATION TRANSMISSION | 26 |
| 51 | READY TO TRANSMIT A DATA FILE (POLLING) | 17, 21 | SET TO "0" | |
| 52 | RESERVED | 1 | RESERVED | 1 |
| 53 | BINARY FILE TRANSFER (BFT) | 16, 17, 21 | BINARY FILE TRANSFER (BFT) | 16, 17 |
| 54 | DOCUMENT TRANSFER MODE (DTM) | 17, 21 | DOCUMENT TRANSFER MODE (DTM) | 17 |
| 55 | ELECTRONIC DATA INTERCHANGE (EDI) | 17, 21 | ELECTRONIC DATA INTERCHANGE (EDI) | 17 |
| 56 | EXTEND FIELD | 5 | EXTEND FIELD | 5 |
| 57 | BASIC TRANSFER MODE (BTM) | 17, 21 | BASIC TRANSFER MODE (BTM) | 17, 59 |
| 58 | RESERVED | 1 | RESERVED | 1 |
| 59 | READY TO TRANSMIT A CHARACTER OR MIXED MODE DOCUMENT (POLLING) | 17, 22 | SET TO "0" | |
| 60 | CHARACTER MODE | 17, 22 | CHARACTER MODE | 17 |
| 61 | RESERVED | 1 | RESERVED | 1 |

*FIG. 5A*

| BIT NUMBER | DIS / DTC | NOTE | DCS | NOTE |
|---|---|---|---|---|
| 62 | MIXED MODE (ANNEX E / T.4) | 17, 22 | MIXED MODE (ANNEX E / T.4) | 17, 22 |
| 63 | RESERVED | 1 | RESERVED | 1 |
| 64 | EXTEND FIELD | 5 | EXTEND FIELD | 5 |
| 65 | PROCESSABLE MODE 26 (ITU-T Rec. T.505) | 17, 22 | PROCESSABLE MODE 26 (ITU-T Rec. T.505) | 17, 22 |
| 66 | DIGITAL NETWORK CAPABILITY | 43 | DIGITAL NETWORK CAPABILITY | 43 |
| 67<br>0<br>1 | DUPLEX AND HALF-DUPLEX CAPABILITIES<br>HALF-DUPLEX OPERATION ONLY<br>DUPLEX AND HALF-DUPLEX OPERATION | | DUPLEX AND HALF-DUPLEX CAPABILITIES<br>HALF-DUPLEX OPERATION ONLY<br>DUPLEX OPERATION | |
| 68 | JPEG CODING | 17, 25, 34, 35, 39, 40 | FULL COLOUR MODE | 17, 25, 34, 35, 39, 40 |
| 69 | FULL COLOUR MODE | 25, 35 | FULL COLOUR MODE | 25, 35 |
| 70 | SET TO "0" | 36 | PREFERRED HUFFMAN TABLES | 25, 36 |
| 71 | 12 BITS / PEL COMPONENT | 25, 37 | 12 BITS / PEL COMPONENT | 25, 37 |
| 72 | EXTEND FIELD | 5 | EXTEND FIELD | 5 |
| 73 | NO SUBSAMPLING (1:1:1) | 25, 38 | NO SUBSAMPLING (1:1:1) | 25, 38 |
| 74 | CUSTOM ILLUMINANT | 25, 39 | CUSTOM ILLUMINANT | 25, 39 |
| 75 | CUSTOM GAMUT RANGE | 25, 40 | CUSTOM GAMUT RANGE | 25, 40 |
| 76 | NORTH AMERICAN LETTER (215.9 × 279.4mm) CAPABILITY | 28 | NORTH AMERICAN LETTER (215.9 × 279.4mm) | |
| 77 | NORTH AMERICAN LEGAL (215.9 × 355.6mm) CAPABILITY | 28 | NORTH AMERICAN LEGAL (215.9 × 355.6mm) | |

*FIG. 5B*

| BIT NUMBER | DIS / DTC | NOTE | DCS | NOTE |
|---|---|---|---|---|
| 78 | SINGLE-PROGRESSION SEQUENTIAL CODING (ITU-T Rec. T. 85) BASIC CAPABILITY | 17, 29, 30 | SINGLE-PROGRESSION SEQUENTIAL CODING (ITU-T Rec. T. 85) BASIC | 17, 29 |
| 79 | SINGLE-PROGRESSION SEQUENTIAL CODING (ITU-T Rec. T. 85) OPTIONAL L0 CAPABILITY | 17, 29, 30 | SINGLE-PROGRESSION SEQUENTIAL CODING (ITU-T Rec. T. 85) OPTIONAL L0 | 17, 29 |
| 80 | EXTEND FIELD | 5 | EXTEND FIELD | 5 |
| 81 | HKM KEY MANAGEMENT CAPABILITY | | HKM KEY MANAGEMENT SELECTED | |
| 82 | RSA KEY MANAGEMENT CAPABILITY | | RSA KEY MANAGEMENT SELECTED | 47 |
| 83 | OVERRIDE CAPABILITY | 53 | OVERRIDE MODE SELECTED | 53 |
| 84 | HFX40 CIPHER CAPABILITY | | HFX40 CIPHER SELECTED | |
| 85 | ALTERNATIVE CIPHER NUMBER 2 CAPABILITY | 56 | ALTERNATIVE CIPHER NUMBER 2 SELECTED | 56 |
| 86 | ALTERNATIVE CIPHER NUMBER 3 CAPABILITY | 56 | ALTERNATIVE CIPHER NUMBER 3 SELECTED | 56 |
| 87 | HFX40-I HASHING CAPABILITY | | HFX40-I HASHING SELECTED | |
| 88 | EXTEND FIELD | 5 | EXTEND FIELD | 5 |
| 89 | ALTERNATIVE HASHING SYS-TEM NUMBER 2 CAPABILITY | 57 | ALTERNATIVE HASHING SYS-TEM NUMBER 2 SELECTED | 57 |
| 90 | ALTERNATIVE HASHING SYS-TEM NUMBER 3 CAPABILITY | 57 | ALTERNATIVE HASHING SYS-TEM NUMBER 3 SELECTED | 57 |
| 91 | RESERVED FOR FUTURE SECURITY FEATURES | 1 | RESERVED FOR FUTURE SECURITY FEATURES | 1 |
| 92 | T. 44 (MIXED RASTER CONTENT) | 17, 50, 69 | T. 44 (MIXED RASTER CONTENT) | 17, 50, 69 |
| 93 | T. 44 (MIXED RASTER CONTENT) | 17, 50, 69 | T. 44 (MIXED RASTER CONTENT) | 17, 50, 69 |
| 94 | T. 44 (MIXED RASTER CONTENT) | 17, 50, 69 | T. 44 (MIXED RASTER CONTENT) | 17, 50, 69 |
| 95 | PAGE LENGTH MAXIMUM STRIP SIZE FOR T. 44 (MIXED RASTER CONTENT) | 51 | PAGE LENGTH MAXIMUM STRIP SIZE FOR T. 44 (MIXED RASTER CONTENT) | 51 |
| 96 | EXTEND FIELD | 5 | EXTEND FIELD | 5 |

*FIG. 6*

COMMUNICATING APPARATUS AND COMMUNICATING SYSTEM

BACKGROUND OF THE INVENTION

1. Field of the Invention

The invention relates to a communicating apparatus and a communicating system, especially, relates to a communicating apparatus and a communicating system that have facsimile function.

2. Related Background Art

Conventional facsimile apparatus, after sent ring signal to receiving facsimile apparatus (partner facsimile apparatus), when received DIS signal which notifies of communication capability supported by the receiving facsimile apparatus (it is the facsimile apparatus which receives the ring signal) from the receiving facsimile apparatus, according to ITU-T (International Telecommunication Union) T.30 recommendation, sends DCS signal which notifies of communication capability supported by self facsimile apparatus to the receiving facsimile apparatus. Then, the conventional facsimile apparatus, when received CFR signal which confirms a communication in the communication capability notified by the DCS signal, sends image data to be printed on a print paper to the receiving facsimile apparatus.

By the way, in general, with facsimile apparatus improves communication capability, a bit number for representing communication capability notified by DIS signal is also increased. Thereby, with respect to old facsimile apparatus whose function is not expanded, even if receiving DIS signal whose bit number is increased, it cannot recognize the received DIS signal, then, occurs communication error, and disconnects communication line.

Therefore, in consideration of the above-mentioned problem, a facsimile apparatus which can prevent the above-mentioned communication error from occurring is provided (refer to patent document 1). Such facsimile apparatus has a function to recognize a sending telephone number, and has a structure to set DIS signal when receiving, into that with smallest bit number, and to send DIS signal whose bit number is bigger to receiving facsimile apparatus when detected specific information. By this, the facsimile apparatus described in the patent document 1 can perform receiving from more facsimile apparatuses (refer to patent document 1).

Patent document 1: Japan patent publication No. 2001-238057.

However, in the above-mentioned facsimile apparatus, because it needs to have hardware for recognizing a sending telephone number, there is a problem that cost of apparatus is raised. And because there is a case that an exchange machine connected with the facsimile apparatus is not notified of a sending telephone number according to its specification, in such case, it is impossible to release the above-mentioned problem.

SUMMARY OF THE INVENTION

It is, therefore, an object of the invention to provide a communicating apparatus and a communicating system capable of solving the above problem. That is, the communicating apparatus or the communicating system can maintain high communication capability between a communicating apparatus which sends an image and a communicating apparatus which receives the image; can inhibit the cost of apparatus itself by eliminating the need to have a hardware for recognizing sending telephone number; and can eliminate dependence upon exchange machine.

According to an aspect of the present invention, there is provided a communicating apparatus, comprising:

a receiving section for receiving signal from partner apparatus;

a receiving capability notification information making section for making a first receiving capability notification information having a predetermined bit number and a second receiving capability notification information having a bit number more than the predetermined bit number; and a receiving controlling section for selecting and sending one of the first receiving capability notification information and the second receiving capability notification information in order to represent a receiving function of self apparatus with respect to the partner apparatus, wherein the receiving controlling section sends the first receiving capability notification information after received a connection request information signal to request a connection from the partner apparatus; if sending capability notification information is not received from partner apparatus within a predetermined time, sends the second receiving capability notification information.

According to an aspect of the present invention, there is provided a communicating apparatus, comprising:

a receiving section for receiving a receiving capability notification information representing receiving function from partner apparatus with respect to a connection request information signal to request to connect with self apparatus;

a judging section for judging whether or not bit number of the receiving capability notification information received by the receiving section, is more than a predetermined bit number; and a sending controlling section for controlling to send a sending capability notification information representing function of self apparatus with respect to partner apparatus to correspond to the receiving capability notification information, wherein the sending controlling section, in the case that bit number of the receiving capability notification information which is firstly received after sent the connection request information, is more than the predetermined bit number, sends sending capability notification information representing function corresponding to the receiving capability notification information; in the case that bit number of the receiving capability notification information which is firstly received after sent the connection request information signal, is equal to a predetermined bit number, waits to receive the receiving capability notification information till a predetermined time is passed without sending capability notification information, then, sends sending capability notification information representing function corresponding to the receiving capability notification information.

According to an aspect of the present invention, there is provided a communicating system, comprising:

a sending apparatus that includes:

a first receiving section for receiving a receiving capability notification information which represents a receiving function from partner apparatus with respect to connection request information signal to request to connect with self apparatus;

a judging section for judging whether or not bit number of the receiving capability notification information received by the first receiving section, is more than a predetermined bit number; and a sending controlling section for controlling a sending of sending capability notification information representing a function of self apparatus with respect to the partner apparatus to correspond to the receiving capability notification information; and a receiving apparatus that includes:

a second receiving section for receiving signal from the sending apparatus;

a receiving capability notification information making section for making a first receiving capability notification information having a predetermined bit number and a second receiving capability notification information having bit number more than the predetermined bit number; and a receiving controlling section for selecting and sending one of the first receiving capability notification information and the second receiving capability notification information in order to represent a receiving function of the self apparatus with respect to the partner apparatus, wherein the receiving controlling section sends the first receiving capability notification information after received the connection request information signal to request to connect from the sending apparatus; in the case sending communication capability notification information is not received from the sending controlling section within a predetermined time, sends the second receiving capability notification information; and wherein the sending controlling section, when received the first receiving capability notification information from the receiving apparatus after sent the connection request information signal, waits to receive the receiving capability notification information till a predetermined time is passed without sending capability notification information; when received the second receiving capability notification information, sends the sending capability notification information representing a function corresponding to the second receiving capability notification information to the receiving apparatus.

According to an aspect of the present invention, in the case that a receiving controlling section receives connection request information signal to request a connection and sends a first receiving capability notification information, but does not receive a sending capability notification information from partner apparatus within a predetermined time, the receiving controlling section sends a second receiving capability notification information. Therefore, it is possible to maintain communication capability between self apparatus and the partner apparatus by high function above a basic communication capability level.

Further, according to another aspect of the present invention, because the partner apparatus is enable to generate sending and receiving capability notification information through using either of the sent first receiving capability notification information and the sent second receiving capability notification information, it is possible for the partner apparatus to eliminate the need to have a hardware for recognizing a sending telephone number, and is possible to reduce the cost of partner apparatus itself, then, it is possible for the partner apparatus to eliminate dependence upon exchange machine.

The above and other objects and features of the present invention will become apparent from the following detailed description and the appended claims with reference to the accompanying drawings.

BRIEF DESCRIPTION OF THE DRAWINGS

FIG. 3A is a first diagram showing a DIS table (I);
FIG. 3B is a first diagram showing a DIS table (II);
FIG. 4A is a second diagram showing a DIS table (I);
FIG. 4B is a second diagram showing a DIS table (II);
FIG. 5A is a third diagram showing a DIS table (I);
FIG. 5B is a third diagram showing a DIS table (II);
FIG. 6 is a fourth diagram showing a DIS table.

DETAILED DESCRIPTION OF THE PREFERRED EMBODIMENTS

Embodiments of the invention will be described in detail hereinbelow with reference to the drawings.

Embodiment 1

Explain of the Construction

Figure 1:
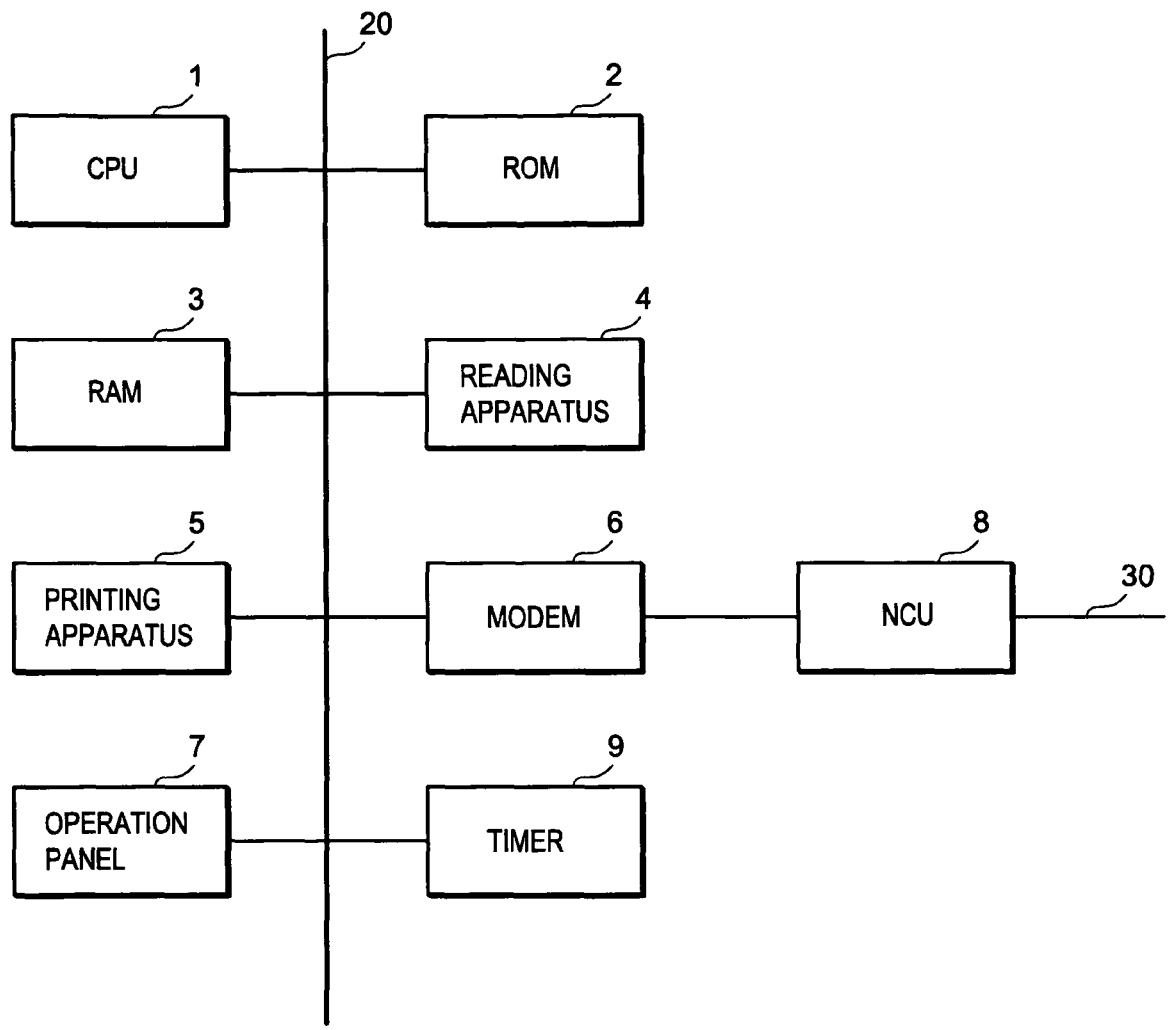
FIG. 1 is a block diagram for showing a structure of a communicating apparatus in embodiment 1 related to the present invention.

FIG. 1 is a block diagram for showing a structure of a communicating apparatus in embodiment 1 related to the present invention.

As shown by FIG. 1, a communicating apparatus in embodiment 1 is a facsimile apparatus which prints image sent from one other facsimile apparatus onto recording medium and sends image data to one other facsimile apparatus. The communicating apparatus in embodiment 1 comprises a CPU 1, a ROM 2, a RAM 3, a reading apparatus 4, a printing apparatus 5, a modem 6, an operation panel 7, a NCU 8 and a timer 9. These are respectively connected with a system bus 20, and the NCU 8 is also connected with a Public Switched Telephone Network (hereinafter referred as PSTN) 30.

Figure 2:
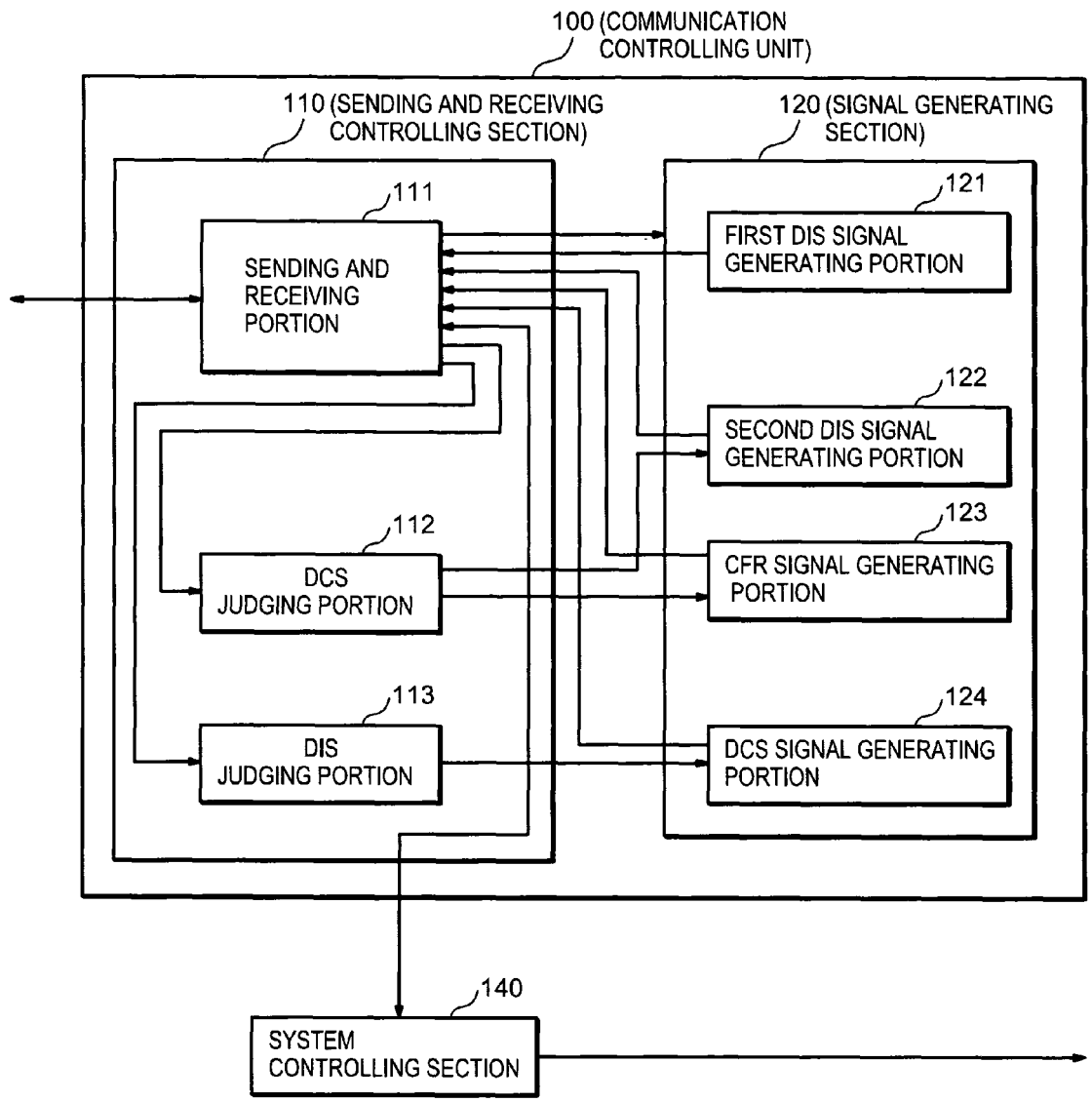
FIG. 2 is a function block diagram of a communication controlling unit in embodiment 1 related to the present invention.

The CPU 1 generates a communication controlling unit 100 and a system controlling section 140 (FIG. 2) that respectively have a function mentioned below through executing communication control program and system control program that are stored in the ROM 2.

The communication controlling unit 100 is a part to execute facsimile transmission control process according to ITU-T (International Telecommunication Union-Telecommunication Standardization Selection) recommendation T.30, it consists of a sending and receiving controlling section 110 and a signal generating section 120.

The sending and receiving controlling section 110 functions as a receiving controlling section when self apparatus is a receiving side and functions as a sending controlling section when self apparatus is a sending side. Further, the sending and receiving controlling section 110 comprises a sending and receiving portion 111, a DCS judging portion 112 and a DIS judging portion 113.

The sending and receiving portion 111 sends first DIS signal, second DIS signal, DCS signal, CFR signal that are generated by the signal generating section 120 and image data to partner facsimile apparatus (hereinafter: communicating apparatus) and receives such information from partner communicating apparatus.

Moreover, regarding timing to send or receive these signals, it will be explained in operation explanation of the communicating apparatus in embodiment 1.

Here, the first DIS signal represents a communication capability of minimum limitation; and has "bit numbers 1~24" in DIS tables as shown by FIG. 3~FIG. 6. The "bit numbers 1~24" are used as common DIS signal of all facsimile apparatus. That is, DIS signal only having "bit numbers 1~24" represents communication capability of minimum limitation which can communicate with one of all facsimile apparatuses.

The second DIS signal is a signal whose bit number is set to exceed 24 from number 1 to number 24, and to larger number. Thus, such DIS signal having bit number beyond 24 is called below "DIS signal having expanded communication capability". The expanded communication capability, for example, as shown by bit number 68 in FIG. 5, has a communication capability to specify whether or not to perform JPEG coding which was not standardized in initial facsimile communication. The second DIS signal of the present embodiment is signal represented by bit numbers 1~96, as shown by the DIS tables in FIG. 3~FIG. 6. However, it is only an example, it may be adopted signal represented by bit number beyond 96 according to standardization condition.

The DCS signal is signal which notifies of communication capability supported by self apparatus in bit unit; and which is sent to receiving side communicating apparatus. The CFR signal is signal representing that the receiving side communicating apparatus has confirmed to perform communication process in the communication capability specified by the DCS signal; and is sent to sending side communicating apparatus.

The DCS judging portion 112, after the first DIS signal was sent to the sending side communicating apparatus, judges whether DCS signal sent from the sending side communicating apparatus is inputted or not within a predetermined time counted by the timer 9. Further, in the case that the DCS judging portion 112 judges the DCS signal which is sent from the sending side communicating apparatus is not inputted within the above-mentioned time, the DCS judging portion 112 outputs a request to generate second DIS signal which notifies of a highest communication capability supported by self apparatus to the signal generating section 120. Furthermore, in the case that the DCS judging portion 112 judges the DCS signal which is sent by the sending side communicating apparatus is inputted within the above-mentioned time, the DCS judging portion 112 outputs a request to generate CFR signal to a CFR signal generating portion 123 in the signal generating section 120.

The DIS judging portion 113 compares communication capability which is notified by the DIS signal received from receiving side communicating apparatus with the highest communication capability which can be supported by the self apparatus via sending and receiving portion 111. As a result of the comparison, the DIS judging portion 113, when the communication capability which is notified by the inputted DIS signal does not reach the highest communication capability which can be supported by the self apparatus, judges that the communication capability of the self apparatus cannot be executed suitably between the self apparatus and the receiving side communicating apparatus and does not perform any process.

The DIS judging portion 113, when the communication capability which is notified by the inputted DIS signal is the same as the highest communication capability which can be supported by the self apparatus, judges that the communication capability of the self apparatus can be executed suitably between the self apparatus and the receiving side communicating apparatus and outputs a request to generate DCS signal to a DCS signal generating portion 124 in the signal generating section 120.

The signal generating section 120 comprises a first DIS signal generating portion 121 which generates first DIS signal and outputs the first DIS signal to the sending and receiving portion 111; a second DIS signal generating portion 122 which generates second DIS signal and outputs the second DIS signal to the sending and receiving portion 111; the CFR signal generating portion 123 which generates CFR signal and outputs the CFR signal to the sending and receiving portion 111; and the DCS signal generating portion 124 which generates DCS signal and outputs the DCS signal to the sending and receiving portion 111.

Moreover, regarding timing related to generation of these signals, it will be explained in operation explanation of the communicating apparatus related to embodiment 1.

In the case that the self apparatus is a sending side apparatus, the DCS signal generating portion 124 functions. In the case that the self apparatus is a receiving side apparatus, the first DIS signal generating portion 121, the second DIS signal generating portion 122 and the CFR signal generating portion 123 function.

The system controlling section 140, when the CFR signal sent by the receiving side apparatus is inputted from the sending and receiving portion 111 of the sending and receiving controlling section 110, reads out image data one after another from the RAM 3; and outputs the image data to the sending and receiving portion 111. Further, the system controlling section 140, after completed to read out all image data stored in the RAM 3, outputs a notification that all image data has been read out to the signal generating section 120. Furthermore, the system controlling section 140, when the notification that the image data has been inputted is inputted, outputs an instruction to request to start printing with respect to the printing apparatus 5.

The ROM 2 shown by FIG. 1 stores the above-mentioned communication control program and system control program that are executed by the CPU 1. The RAM 3 temporally stores data which is generated when the CPU 1 executes the communication control program and the system control program. Further, the RAM 3 temporally stores image data which is sent from partner communicating apparatus.

The reading apparatus 4 is formed from, for example, a scanning apparatus using CCD and the like, the reading apparatus 4 reads manuscript and changes the read manuscript image into image data.

The printing apparatus 5 is a printer apparatus adopting, for example, thermal record method, electronic photographic method or the like. Further, the printing apparatus 5 copies image data received by facsimile apparatus on medium.

The modem 6 modulates and demodulates control data or image data that is sent or is received between communicating apparatuses; and sends or receives these data between communicating apparatuses according to facsimile transmission control process.

The operation panel 7 comprises, for example, a liquid crystal device (LCD), a CRT (Cathode-Ray Tube) or the like. Further, the operation panel 7 has a displaying section for displaying a condition of self apparatus, operation method and the like; and a operating section for operating self apparatus, which has function key, cursor key, start key, dial key and the like.

The NCU (Network Control Unit) 8 performs control of communication connection and cutoff between the modem 6 and the PSTN 30.

The timer 9, after the sending and receiving portion 111 in the sending and receiving controlling section 110 sent first DIS signal to partner communicating apparatus, counts the passage of a predetermined time.

Next, regarding operation of communicating apparatus in embodiment 1, it will be explained.

[A Case to Comprise a Sending Side Communicating Apparatus Related to the Present Invention and a Receiving Side Communicating Apparatus Related to the Present Invention]

Figure 7:
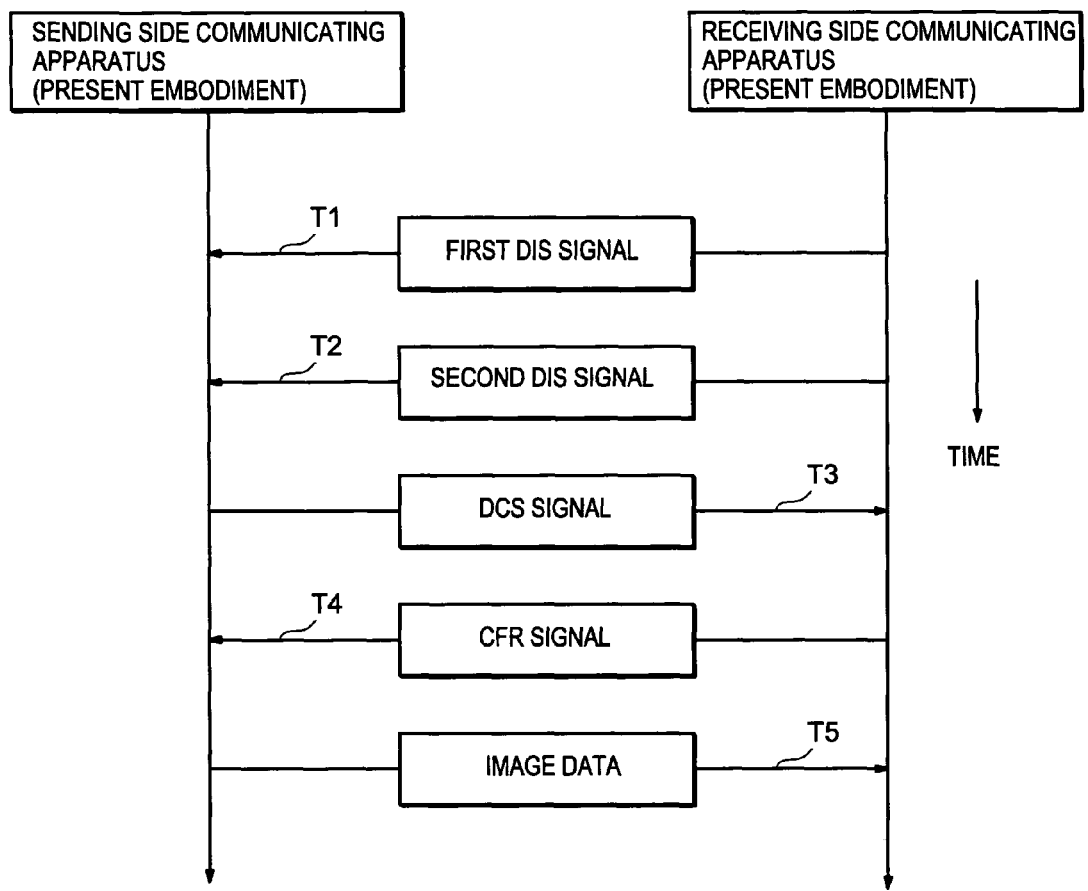
FIG. 7 is a sequence diagram for showing a transmission control sequence of a communicating apparatus in embodiment 1 related to the present invention.

FIG. 7 is a sequence diagram for showing a transmission control sequence of a communicating apparatus in embodiment 1 related to the present invention.

That is, FIG. 7 is a diagram for explaining a facsimile transmission control process which the communication controlling unit 100 executes according to ITU-T recommendation T.30. Regarding the facsimile transmission control process, it will be explained as follows according to FIG. 7.

A sequence shown by FIG. 7, represents phase B to phase C in the ITU-T recommendation T.30. Here, phase B is a pre-message process, phase C is an in message process, and phase B and phase C are phases for performing message transmission. Here, in FIG. 7, communicating apparatus serving as a sending side facsimile apparatus and communicating apparatus serving as a receiving side facsimile apparatus have a structure related to embodiment 1. Moreover, regarding a term of "present invention" in the sending side communicating apparatus (present embodiment) and in the receiving side communicating apparatus (present embodiment) shown by FIG. 7, it represents that these communicating apparatuses are communicating apparatus having the structure of embodiment 1 related to the present invention.

When the receiving side communicating apparatus is connected with the sending side communicating apparatus via communication line, the receiving side communicating apparatus, sends first DIS signal which notifies of supportable communication capability of minimum limitation needed in all facsimile apparatus from supportable communication abilities, to the sending side communicating apparatus via PSTN 30 (refer to T1 in FIG. 7); and starts up the timer 9.

The sending side communicating apparatus, when the first DIS signal is sent via PSTN 30, compares communication capability notified by the inputted first DIS signal with highest communication capability which is supportable by self apparatus, as a result, because the highest communication capability which is supportable by self apparatus is higher than the communication capability notified by the first DIS signal, so the sending side communicating apparatus judges that it is impossible yet for the self apparatus to demonstrate the most suitable communication capability, and then, ignores a response with respect to the first DIS signal which is sent from the receiving side communicating apparatus.

The receiving side communicating apparatus, when the timer 9 passed the predetermined time, sends second DIS signal which notifies of the highest communication capability which is supportable by self apparatus to the sending side communicating apparatus via PSTN 30 (refer to T2 in FIG. 7). Moreover, communication capability notified by the second DIS signal which is sent by the receiving side communicating apparatus, because the receiving side communicating apparatus and the sending side communicating apparatus are the same, is the same as the highest communication capability which is supportable by the sending side communicating apparatus.

The sending side communicating apparatus, when the second DIS signal is sent via PSTN 30, compares communication capability which is notified by the inputted second DIS signal with the highest communication capability which is supportable by self apparatus, as a result, because these communication abilities are the same, the sending side communicating apparatus sends DCS signal which notifies that communication capability supported between the self apparatus and the receiving side communicating apparatus is set to the highest communication capability supported by the self apparatus to receiving side communicating apparatus via PSTN 30 (refer to T3 in FIG. 7).

The receiving side communicating apparatus, when the DCS signal is sent from the sending side communicating apparatus, sends CFR signal which represents it has been confirmed to execute communication process in the communication capability notified by the DCS signal to the sending side communicating apparatus via PSTN 30 (refer to T4 in FIG. 7).

When the CFR signal is sent by the receiving side communicating apparatus, the sending side communicating apparatus reads out image data one after another, which is stored in the RAM 3; and which contains dot image data. Further, the sending side communication apparatus codes the read image data; and sends the coded image data to the receiving side communicating apparatus via PSTN 30 (refer to T5 in FIG. 7).

Figure 8:
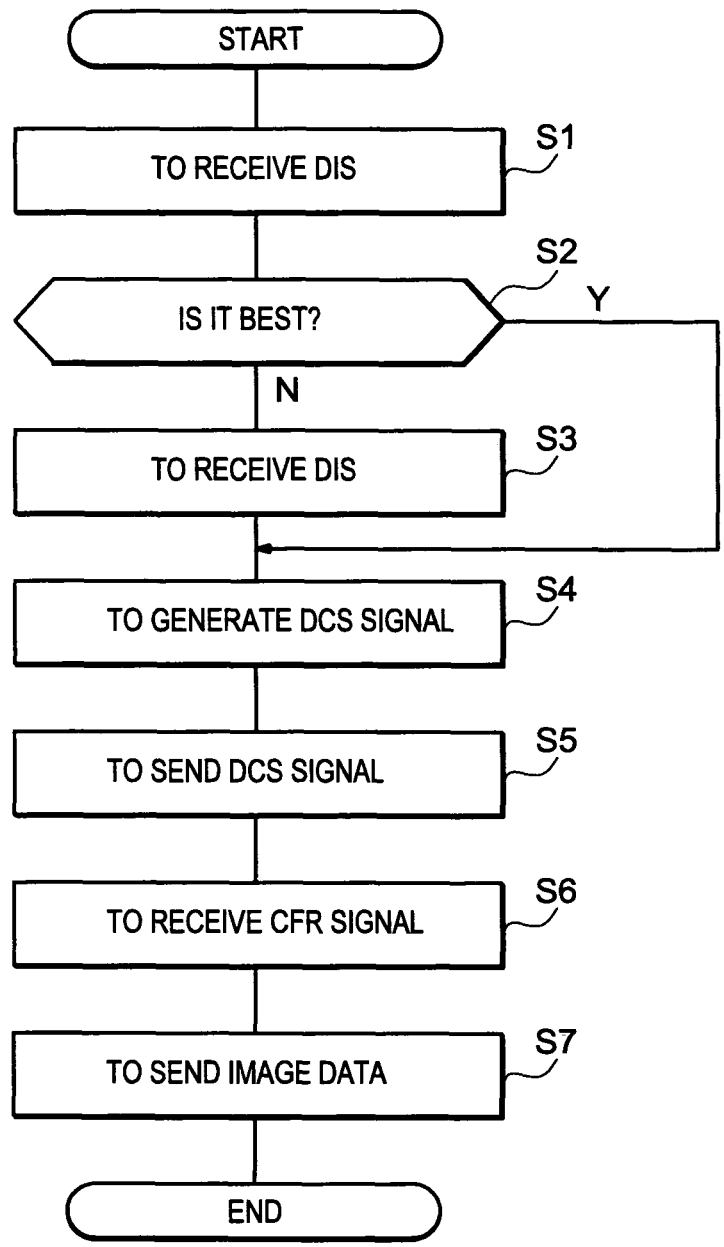
FIG. 8 is a flowchart for explaining operation of a sending side communicating apparatus in embodiment 1 related to the present invention.

FIG. 8 is a flowchart for explaining operation of a sending side communicating apparatus in embodiment 1 related to the present invention.

The sending side communicating apparatus in embodiment 1, after connected with receiving side communicating apparatus via telephone line, receives DIS signal from the receiving side communicating apparatus (step S1).

The sending and receiving portion 111, when the above DIS signal is inputted via modem 6, outputs the DIS signal to the DIS judging portion 113 of the sending and receiving controlling section 110.

After that, the DIS judging portion 113 compares communication capability of the receiving side with communication capability of self apparatus (sending side apparatus) according to the inputted DIS signal; and judges whether to be able to communicate by using the highest communication capability.

That is, the DIS judging portion 113 reads the DIS signal which is received from the receiving side communicating apparatus; and judges whether the communication capability which is notified by the received DIS signal is communication capability of minimum limitation or high communication capability according as bit value of the DIS signal is a predetermined bit value and below a predetermined bit value, or exceed the predetermined bit value. The predetermined bit value represents "bit number 24" in DIS table shown by FIG. 4 as an example, Bit numbers 1~24 are codes which represents communication capability of minimum limitation needed in all facsimile apparatus.

On the one hand, the DIS judging portion 113, in the case that the received DIS signal has bit value beyond 24 bits, judges that it is possible to communicate by using high communication capability (Step S2; Yes); outputs a notification representing the possibility to the signal generating section 120. Then, the process is shifted to Step S4.

On the other hand, the DIS judging portion 113, in the case that the received DIS signal has bit value equal to or below 24 bits, judges that the communication capability is communication capability of minimum limitation (Step S2; No); and stands by for DIS signal to be inputted again.

As shown by FIG. 7, in the case that both of sending side apparatus and receiving side apparatus are communicating apparatus related to the present invention, because DIS signal which is received from the receiving side communicating apparatus is first DIS signal; it has bit numbers 1~24; and it is judged to be communication by using essential communication capability, so Step S2 becomes No, then, the DIS judging portion 113 waits till DIS signal is inputted again. Here, a waiting time is set to a predetermined time (retrying time of DIS signal).

After that, DIS signal which represents high communication capability is inputted from the receiving side communicating apparatus to the sending and receiving controlling section 110 (Step S3). On the one hand, in the case that bit number of the inputted DIS signal is beyond bit number 24, the DIS judging portion 113 outputs a request to generate corresponding DCS signal to the DCS signal generating portion 124 in the signal generating section 120.

On the other hand, in the case that the inputted DIS signal corresponds to bit number 1~24, the DIS judging portion 113 outputs a request to generate DCS signal which notifies to communicate by using essential communication capability to the DCS signal generating portion 124 in the signal generating section 120.

In the case that both of sending side apparatus and receiving side apparatus that are shown by FIG. 7 are communicating apparatus related to the present invention, the DIS signal which is received again from the receiving side communicating apparatus is second DIS signal; and it has bit numbers 1~96. Therefore, it is judged that it is possible to communicate by using expanded communication capability which is able to be supported by the self apparatus, so Step S2 becomes Yes, a request to generate DCS signal corresponding to DIS signal which has bit numbers 1~96 is outputted to the DCS signal generating portion 124.

The DCS signal generating portion 124, when the request is inputted by the DIS judging portion 113, generates DCS signal which notifies of communication capability within the range that the self apparatus can support (Step S4); and outputs the generated DCS signal to the sending and receiving portion 111.

In the case that both of sending side apparatus and receiving side apparatus that are shown by FIG. 7 are communicating apparatus related to the embodiment of the present invention, the DCS signal generating portion 124 generates DCS signal which notifies of extended communication capability corresponding to bit number 1~96 of DIS signal, which is able to be supported by the self apparatus; and outputs it to the sending and receiving portion 111.

The sending and receiving portion 111 outputs the DCS signal which is generated by the DCS signal generating portion to the modem 6.

The modem 6, when the DCS signal is inputted by the sending and receiving portion 111, changes the DCS signal formed from digital data into DCS signal formed from analog data; and outputs it to the NCU 8.

The NCU 8, when the DCS signal is inputted by the modem 6, sends the DCS signal to the receiving side communicating apparatus via PSTN 30 (Step S5).

After CFR signal which represents that it has been confirmed to execute communication process in the communication capability specified by the DCS signal, is sent via PSTN 30 and is inputted from the NCU 8 (Step S6), the modem 6 of the sending side communicating apparatus demodulates it into CFR signal formed from digital signal; and outputs the CFR signal to the sending and receiving portion 111.

After that, the sending and receiving portion 111 outputs the CFR signal to the system controlling section 140. The system controlling section 140, when the CFR signal is inputted by the sending and receiving portion 111, reads out image data one after another from RAM; and outputs the image data to the sending and receiving portion 111.

The sending and receiving portion 111, when the image data is inputted one after another by the system controlling section 140, outputs the inputted image data to the modem 6.

The modem 6, when the image data is inputted one after another by the sending and receiving portion 111, changes the image data formed from digital data into image data formed from analog data; and outputs it to the NCU 8.

The NCU 8 sends the image data which is inputted by the modem 6 to the receiving side communicating apparatus via PSTN 30 (Step S7), and finishes the process.

Figure 9:
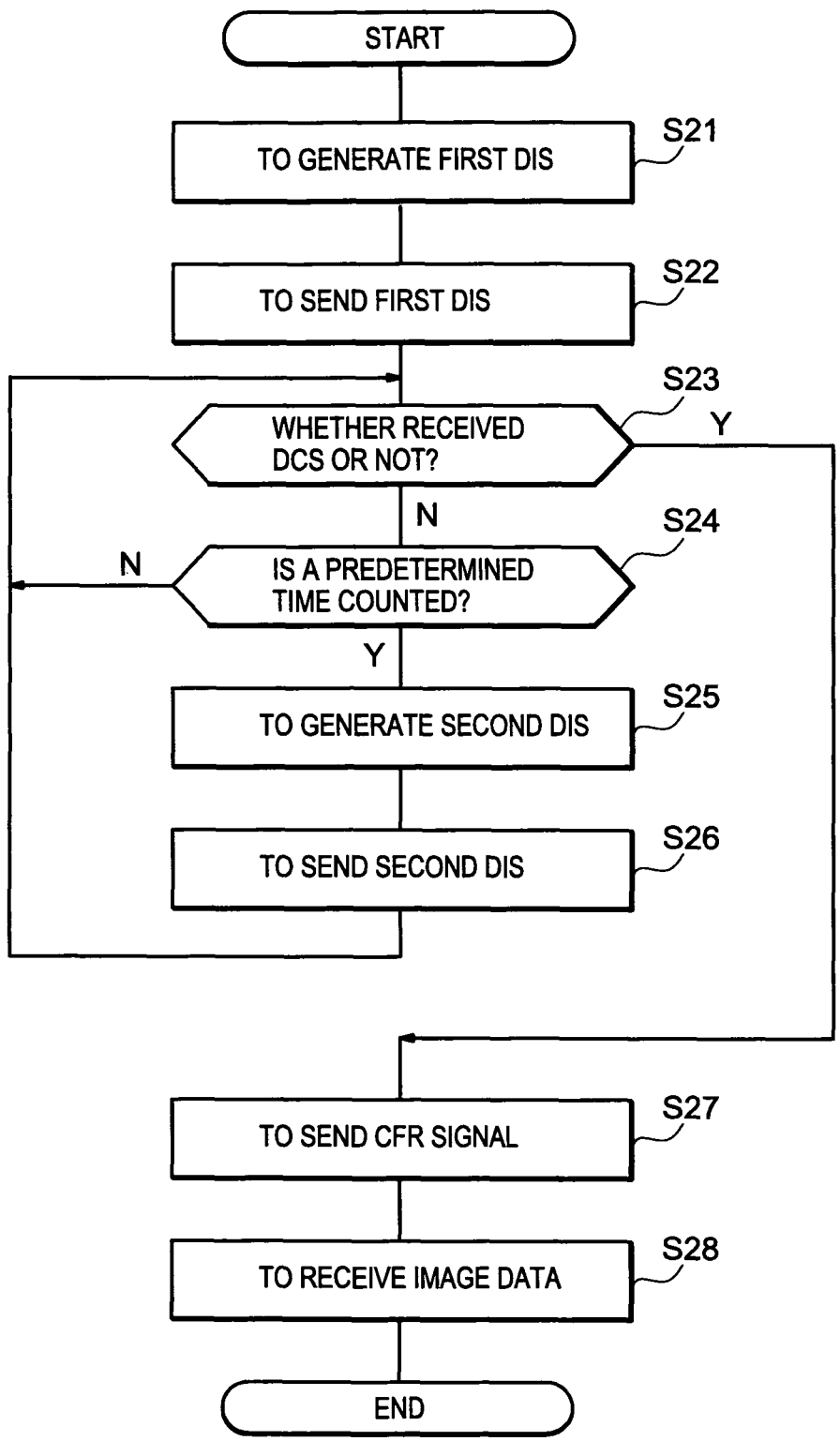
FIG. 9 is a flowchart for explaining operation of a receiving side communicating apparatus in embodiment 1 related to the present invention.

FIG. 9 is a flowchart for explaining operation of a receiving side communicating apparatus in embodiment 1 related to the present invention.

When the receiving side communicating apparatus is communicatively connected with the sending side communicating apparatus via telephone line, the first DIS signal generating portion 121 generates first DIS signal which notifies of supportable communication capability of minimum limitation in all facsimile apparatus (Step S21); and outputs the first DIS signal to the sending and receiving portion 111.

The sending and receiving portion 111 outputs the first DIS signal inputted by the first DIS signal generating portion 121 to the modem 6; and makes the timer 9 start to check passage of time.

The modem 6, when the first DIS signal is inputted by the sending and receiving portion 111, generates first DIS signal formed from analog data; and outputs it to the NCU 8.

The NCU 8 connects the PSTN 30 with line of the modem 6; and sends the first DIS signal which is inputted by the modem 6 to the sending side communicating apparatus via PSTN 30 (Step S22).

After that, the DCS judging portion 112 of the sending and receiving controlling section 110 judges whether DCS signal which notifies of communication capability supported by the sending side communicating apparatus, is inputted from the sending and receiving portion 111 or not (Step S23). In the case that the DCS judging portion 112 judges that the DCS signal is not inputted (Step S23; No), judges whether the timer 9 checks passage of a predetermined time or not (Step S24).

In the case that the DCS judging portion 112 judges that the timer 9 does not check passage of a predetermined time (Step S24; No), Step S23 is started. In the case that the DCS judging portion 112 judges that the timer 9 checks passage of a predetermined time (Step S24;Yes), outputs a request to generate second DIS signal which notifies of the highest communication capability supported by the self apparatus to the second DIS signal generating portion 122 in the signal generating section 120.

The second DIS signal generating portion 122, according to the request inputted by the DCS judging portion 112, generates second DIS signal which notifies of the highest communication capability supported by the self apparatus (Step S25); and outputs the second DIS signal to the sending and receiving portion 111.

After that, the sending and receiving portion 111 outputs the second DIS signal which is inputted by the second DIS signal generating portion 122 to the modem 6.

The modem 6, when the second DIS signal is inputted by the sending and receiving portion 111, generates second DIS signal formed from analog data; and outputs it to the NCU 8.

The NCU 8 connects the PSTN 30 with line of the modem 6; sends the second DIS signal which is inputted by the modem 6 to the sending side communicating apparatus via PSTN 30 (Step S26); then, the process is shifted to Step S23.

In Step S23, in the case that the DCS judging portion 112 judges that the DCS signal is received from the sending and receiving portion 111 (Step S23; Yes), outputs a request to generate CFR signal to the CFR signal generating portion 123 in the signal generating section 120.

The CFR signal generating portion 123, when the request is inputted, generates CFR signal which represents that it has been confirmed to execute communication process in the communication capability specified by the DCS signal; and outputs the generated CFR signal to the sending and receiving portion 111.

After that, the sending and receiving portion 111 outputs the CFR signal which is inputted by the CFR signal generating portion 123 to the modem 6.

The modem 6, when the CFR signal is inputted by the sending and receiving portion 111, generates CFR signal formed from analog data; and outputs it to the NCU 8.

The NCU 8 connects the PSTN 30 with line of the modem 6; and sends the CFR signal which is inputted by the modem 6 to the sending side communicating apparatus via PSTN 30 (Step S27).

After that, the modem 6 changes image which is inputted one after another from the sending side communicating apparatus into image data formed from digital signal; and outputs the image data to the sending and receiving portion 111 (Step S28).

The sending and receiving portion 111 temporarily stores the image data which is inputted one after another by the modem 6 into the RAM 3; outputs a notification that the image data is inputted to the system controlling section 140; then, the process is finished.

Moreover, the system controlling section 140, when the notification is inputted, outputs an instruction to request print start with respect to the printing apparatus 5.

The printing apparatus 5, when the instruction is inputted by the system controlling section 140 which is generated by the CPU 1, reads out the image data stored in the RAM 3 one after another; restores the image data; and prints out them on a printing medium.

[A Case to Comprise a Sending Side Communicating Apparatus of Old Type and a Receiving Side Communicating Apparatus Related to the Present Invention]

Figure 10:
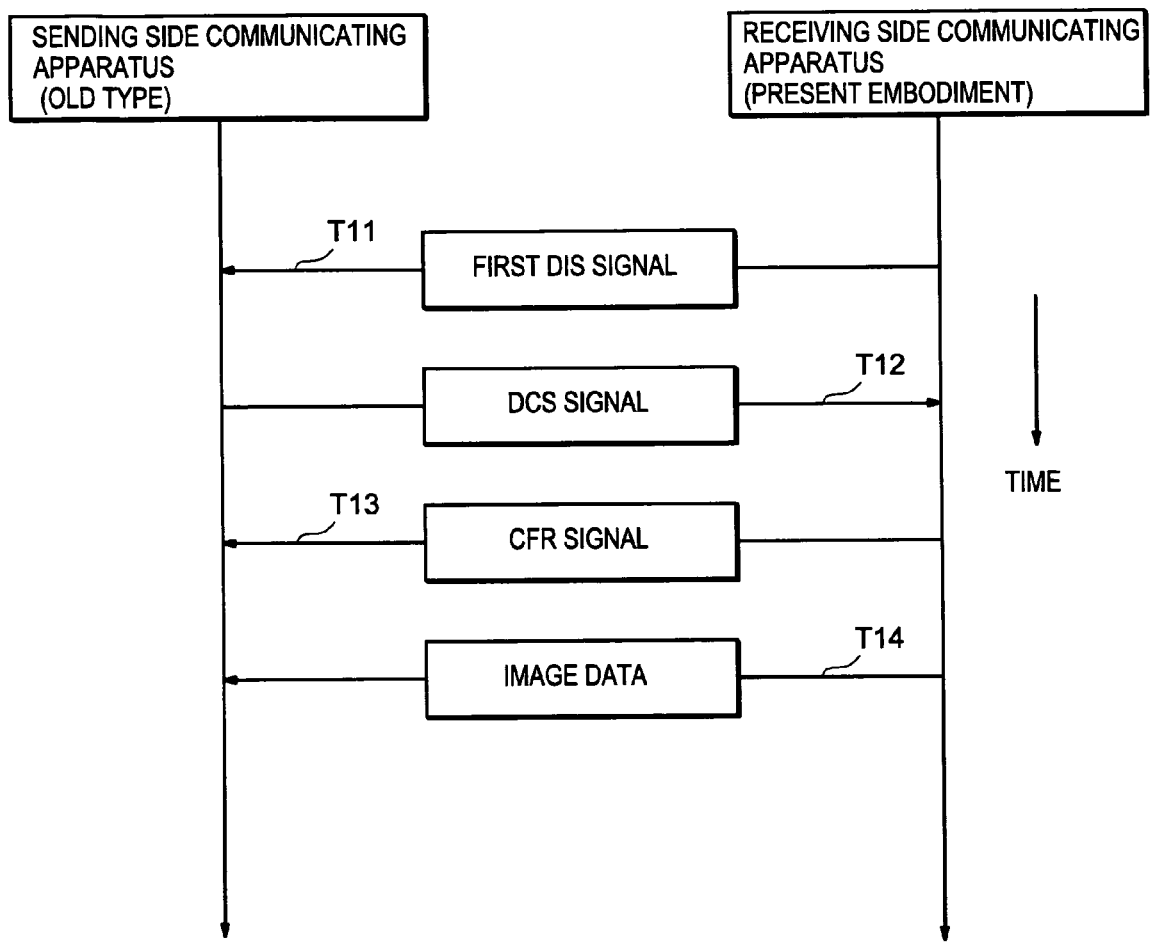
FIG. 10 is a sequence diagram for showing a transmission control sequence of a communicating apparatus in embodiment 1 related to the present invention.

FIG. 10 is a sequence diagram for showing a transmission control sequence of a communicating apparatus in embodiment 1 related to the present invention. Here, the sending side communicating apparatus in FIG. 10 is a communicating apparatus which does not have a structure related to the present embodiment; and the receiving side communicating apparatus is a communicating apparatus which has a structure related to embodiment 1 of the present invention. Moreover, regarding a term of "old type" in the sending side communicating apparatus (old type) shown by FIG. 10, it represents that the sending side communicating apparatus is an old type communicating apparatus whose supportable communication capability is low. Regarding a term of "present embodiment" in the a receiving side communicating apparatus (present embodiment), it represents that the receiving side communicating apparatus is a communicating apparatus having the structure of embodiment 1 related to the present invention.

The receiving side communicating apparatus, when communicatively connected with the sending side communicating apparatus via telephone line, sends first DIS signal which notifies of supportable essential communication capability in all communicating apparatus to the sending side communicating apparatus via PSTN 30 (refer to T1 in FIG. 10); and makes the timer 9 start up.

The sending side communicating apparatus, when the first DIS signal is sent via PSTN 30, compares communication capability which is notified by the first DIS signal with communication capability which can be supported by the self apparatus. As a result, because the communication capability which is notified by the first DIS signal is lower than the communication capability of the self apparatus, or is equal to the communication capability of the self apparatus, the sending side communicating apparatus properly interprets the first DIS signal. Next, the sending side communicating apparatus sends DCS signal of corresponding communication capability to the receiving side communicating apparatus via PSTN 30 (refer to T12 in FIG. 10).

The receiving side communicating apparatus, when the DCS signal is sent from the sending side communicating apparatus, sends CFR signal which represents that it has been confirmed to execute communication process in the communication capability notified by the DCS signal to the sending side communicating apparatus via PSTN 30 (refer to T13 in FIG. 10).

Then, the sending side communicating apparatus sends image data one after another to the receiving side communicating apparatus, and the receiving side communicating apparatus receives the image data which is sent by the sending side communicating apparatus (refer to T14 in FIG. 10).

Figure 11:
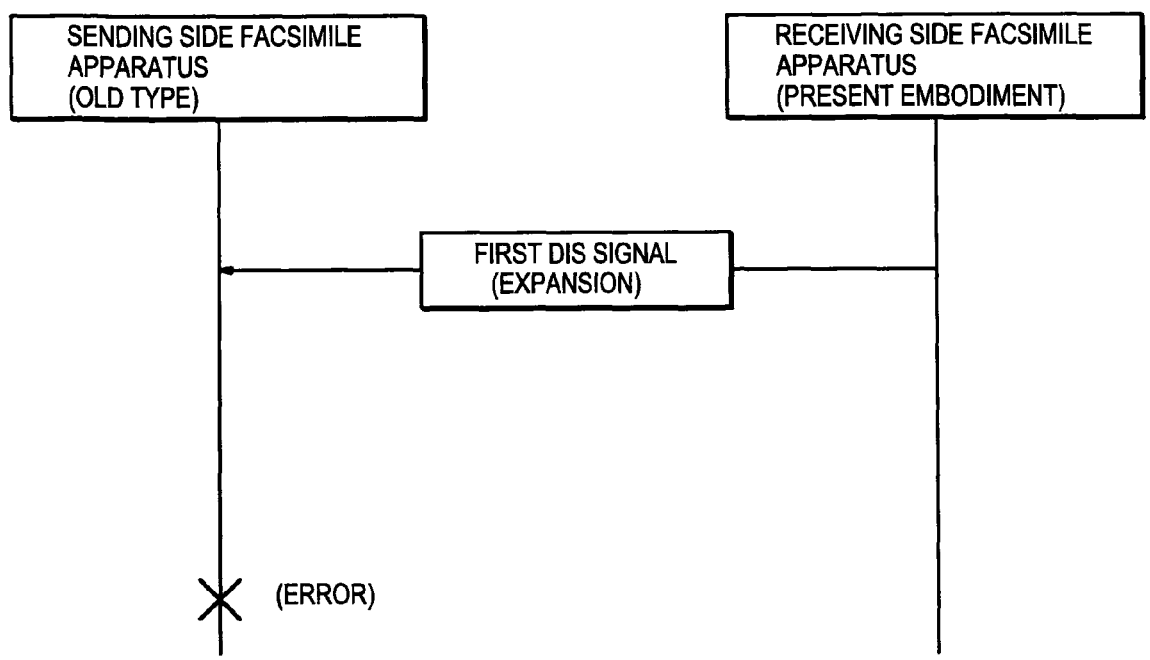
FIG. 11 is a sequence diagram for showing a transmission control sequence of a communicating apparatus in embodiment 1 related to the present invention.

As shown by FIG. 11, in the case that a communicating apparatus such as old type facsimile apparatus (sending side (old type)) and a communicating apparatus such as facsimile apparatus which has expanded communication capability (receiving side (present embodiment)) perform a communication, because the sending side communicating apparatus cannot interpret extension definition part of DIS signal which is received from the receiving side facsimile apparatus, communication error occurs. On the contrary, in embodiment 1, in the case that the communication apparatus functions as a receiving side communicating apparatus which receives image data, because DIS signal which notifies of communication capability of minimum limitation is sent to the sending side communication apparatus; and the DIS signal is interpreted properly, so it is possible for the sending side communicating apparatus to prevent communication error from occurring.

[A Case to Comprise a Sending Side Communicating Apparatus Related to the Present Embodiment and a Receiving Side Communicating Apparatus of Old Type]

Figure 12:
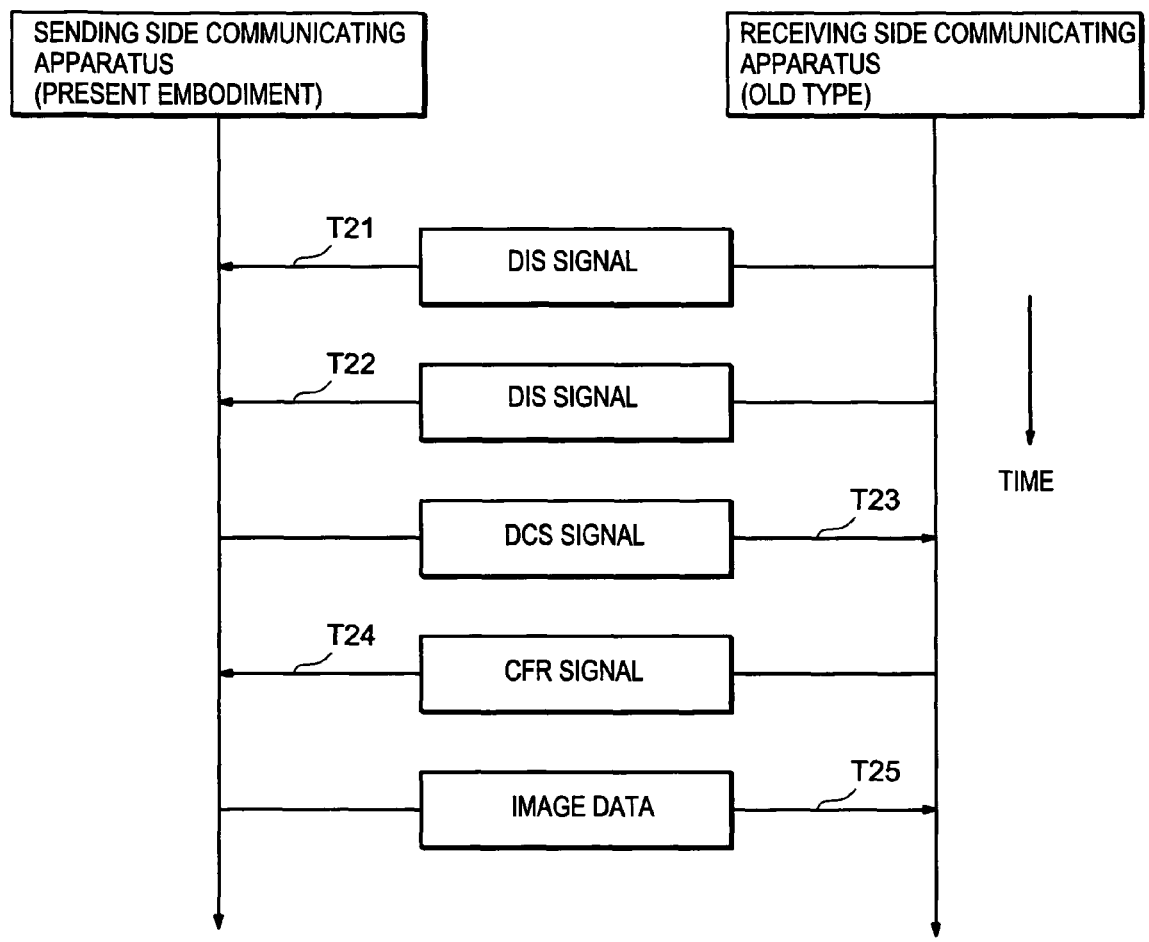
FIG. 12 is a sequence diagram for showing a transmission control sequence of a communicating apparatus in embodiment 1 related to the present invention.

FIG. 12 is a sequence diagram for showing a transmission control sequence of a communicating apparatus in embodiment 1 related to the present invention. Here, the sending side facsimile apparatus in FIG. 12 is a communicating apparatus which has a structure related to the present embodiment; and the receiving side communicating apparatus is a communicating apparatus which does not have a structure related to embodiment 1 of the present invention. Moreover, regarding a term of "present embodiment" in the sending side communicating apparatus (present embodiment) shown by FIG. 12, it represents that the sending side communicating apparatus is a communicating apparatus having the structure related to the present embodiment. Regarding a term of "old type" in the receiving side communicating apparatus (old type), it represents that the receiving side communicating apparatus is an old type communicating apparatus whose supportable communication capability is low (that is, it is a communicating apparatus having DIS signal which has bit numbers 1~24). Moreover, the highest communication capability capable of being supported by the receiving side communicating apparatus is lower than a communication capability supported by the sending side communicating apparatus.

The receiving side communicating apparatus, when communicatively connected with the sending side communicating apparatus via telephone line, sends DIS signal which notifies of communication capability which is supported by the self apparatus to the sending side communicating apparatus via PSTN 30 (refer to T21 in FIG. 12); and makes the timer 9 start up.

The sending side communicating apparatus, when the DIS signal is sent via PSTN 30, compares communication capability which is notified by the inputted DIS signal with communication capability which can be supported by the self apparatus. As a result, because the inputted DIS signal is not beyond 24 bits, the sending side communicating apparatus judges that it is impossible for the self apparatus to effectively demonstrate communication capability, and then, ignores a response with respect to the sent DIS signal.

The receiving side communicating apparatus, when the timer 9 passed a predetermined time, sends again the same DIS signal via PSTN 30 to the sending side communicating apparatus, according to a retrying operation (refer to T22 in FIG. 12).

The sending side communicating apparatus, when the DIS signal is sent via PSTN 30, sends DCS signal which represents that communication capability notified by the inputted DIS signal (bit number 1~24) (that is, communication capability of minimum limitation) has been set to the receiving side communicating apparatus via PSTN 30 (refer to T23 in FIG. 12).

The receiving side communicating apparatus, when the DCS signal is sent from the sending side communicating apparatus, sends CFR signal which represents that it has been confirmed to execute communication process in the communication capability notified by the DCS signal to the sending side communicating apparatus via PSTN 30 (refer to T24 in FIG. 12).

Then, the sending side communicating apparatus sends image data one after another to the receiving side communicating apparatus, and the receiving side communicating apparatus receives the image data (refer to T25 in FIG. 12).

Moreover, in the case to use old type receiving side communicating apparatus, there is a possibility that DIS signal is beyond bit value 24; but is less than high communication capability supportable by the present embodiment. In this case, the sending side communicating apparatus related to the present embodiment makes the step S2 of FIG. 8 produce Yes, then, the process is shifted to step S4. Next, the sending side communicating apparatus generates DCS signal which has a communication capability notified by DIS signal (it has bit value beyond 24, but below 96); and sends it to receiving side apparatus. In this case, T22 in FIG. 12 is omitted.

According to embodiment 1, in the case that a sending side communicating apparatus relates to a communicating apparatus of embodiment 1; and a receiving side communicating apparatus is a communicating apparatus of old type, because the sending side communicating apparatus sends DCS signal to the receiving side communicating apparatus with respect to second DIS signal which notifies that communication capability of the second DIS signal is higher than that of first DIS signal, it is possible to prevent communication error from occurring; and it is possible to set communication capability between the sending side communicating apparatus and the receiving side communicating apparatus into the highest communication capability of old type communicating apparatus.

Further, according to embodiment 1, in the case that a sending side communicating apparatus relates to a communicating apparatus of embodiment 1; and a receiving side communicating apparatus also relates to a communicating apparatus of embodiment 1, because the sending side communicating apparatus sends DCS signal to the receiving side communicating apparatus with respect to second DIS signal which notifies that communication capability of the second DIS signal is higher than that of first DIS signal, it is possible to prevent communication error from occurring; and it is possible to set communication capability between the sending side communicating apparatus and the receiving side communicating apparatus into the highest communication capability of the communicating apparatus in embodiment 1.

Furthermore, according to embodiment 1, because the sending side communicating apparatus receives second DIS signal from the receiving side communicating apparatus, it is possible to eliminate the need of having hardware for recognizing a sending telephone number. Therefore, it is possible to reduce the cost of apparatus for having the hardware; and it is possible to eliminate dependence on exchange machine.

On the one hand, according to T.30 recommended by ITU-T, regarding the establishment of communication route, there is a standard restriction that signal flowing in the communication route spends 2 seconds i.e. 600 bit in a communication speed of 300 bps. Therefore, conventional products are made in accordance with the standard. On the other hand, bit definition of expansion definition part of DIS signal is rapidly enlarged accompanying with a tendency for high performance of facsimile apparatus. Accordingly, in future, it is expected that the length of DIS signal exceeds 300 bits per second. Thus, according to the enlargement request of signal length, there is a possibility that product which ignores the standard restriction will appear of 2 seconds in the communication speed of 300 bps. in the case to use the same two such products, it is possible to establish communication route utilizing surely a high performance capability. However, in the case to use a such product and a conventional product designed according to a standard of 2 seconds in communication speed of 300 bps, such problem may easily occurs that a communication route between them cannot be established. In embodiment 1, because DIS signal which notifies a lowest communication capability serving as a basic capability is firstly sent, it can effectively and certainly realize the establishment of communication route with respect to a products made in accordance with the standard of 2 seconds in the communication speed of 300 bps.

In the above embodiment 1, in the case that a communicating apparatus of the present embodiment is a receiving side communicating apparatus, its structure is that first DIS signal is sent when the communicating apparatus of the present embodiment is communicatively connected with sending side communicating apparatus via telephone line, however, taking the place of the structure, it may be adopted a structure that, when the communicating apparatus of the present embodiment is communicatively connected with sending side communicating apparatus via telephone line, first DIS signal is sent to sending side communicating apparatus after the communicating apparatus of the present embodiment is received CNG signal (calling tone) from the sending side communicating apparatus via exchange machine.

Further, according to embodiment 1, a receiving side communicating apparatus, after sent first DIS signal, sends second DIS signal after a predetermined time is passed, however, instead of the structure, it may adopt a structure that the receiving side communicating apparatus sends first DIS signal to sending apparatus (partner apparatus) in a predetermined cycle T4 during a predetermined time T1; in the case that DCS signal is not received from sending apparatus within the predetermined time, the receiving side communicating apparatus sends second DIS signal in the predetermined cycle T4 during the predetermined time T1. Here, for example, T1 is 35+5 seconds, and T4 is 3.0 seconds ±15%.

By the above structure, it is possible for retrying operation of general DIS signal to attempt a consistency with first DIS signal and second DIS signal of the present embodiment. That is, even if first DIS signal to be firstly received is not reached due to any line trouble, because second DIS signal is resent during predetermined time T1, it is possible to prevent such communication error caused by initially receiving first DIS signal as in old type communicating apparatus.

Embodiment 2

Figure 13:
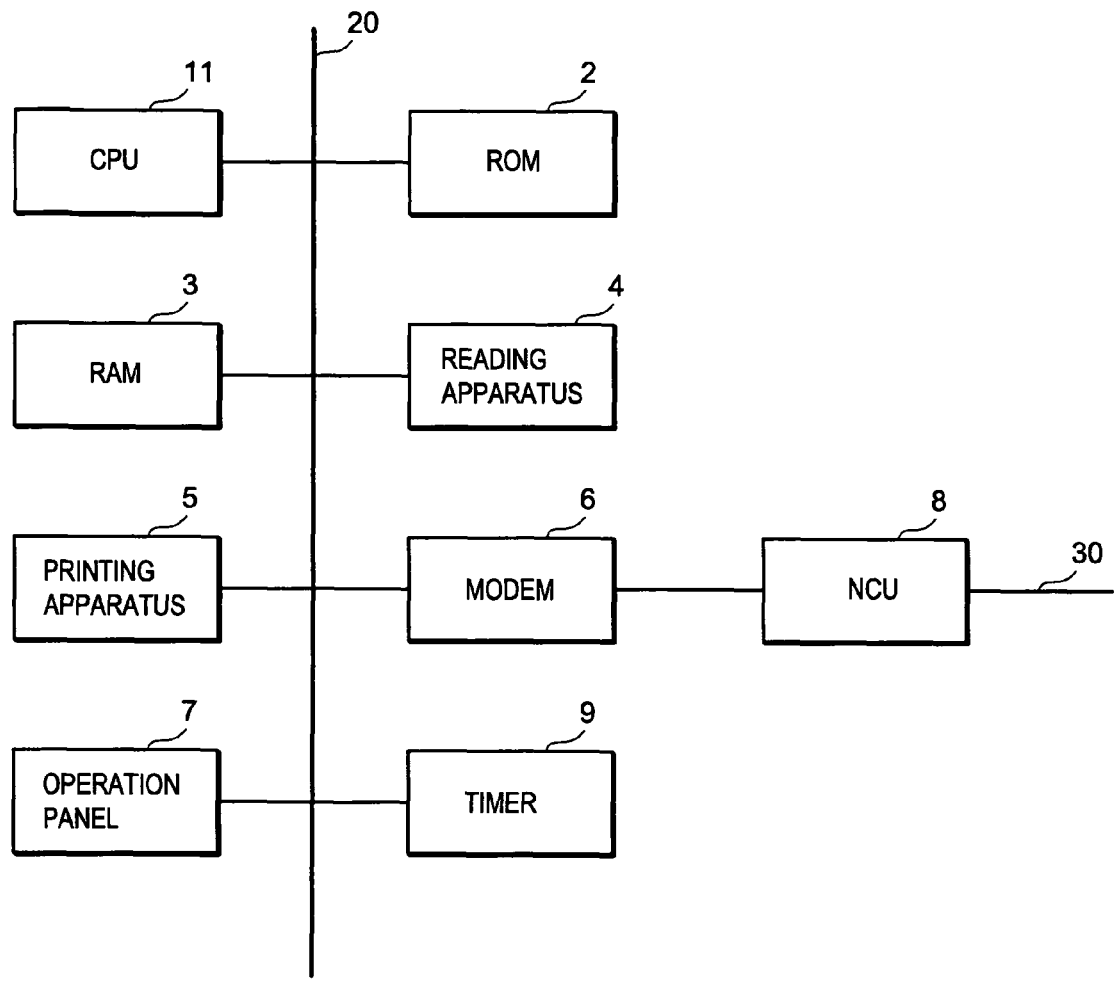
FIG. 13 is a block diagram for showing a structure of a communicating apparatus in embodiment 2 related to the present invention.

A communicating apparatus in embodiment 2 is a facsimile apparatus which prints image sent from one other facsimile apparatus onto record medium and sends image data to one other facsimile apparatus. Further, as same as embodiment 1, as shown by FIG. 13, the communicating apparatus in embodiment 2 comprises a CPU 11, a ROM 2, a RAM 3, a reading apparatus 4, a printing apparatus 5, a modem 6, an operation panel 7, a NCU 8 and a timer 9. These are respectively connected with a system bus 20, and the NCU 8 is also connected with a PSTN 30.

Here, the RAM 3, the reading apparatus 4, the printing apparatus 5, the modem 6, the operation panel 7, the NCU 8 and the timer 9 are the same as that of embodiment 1.

Figure 14:
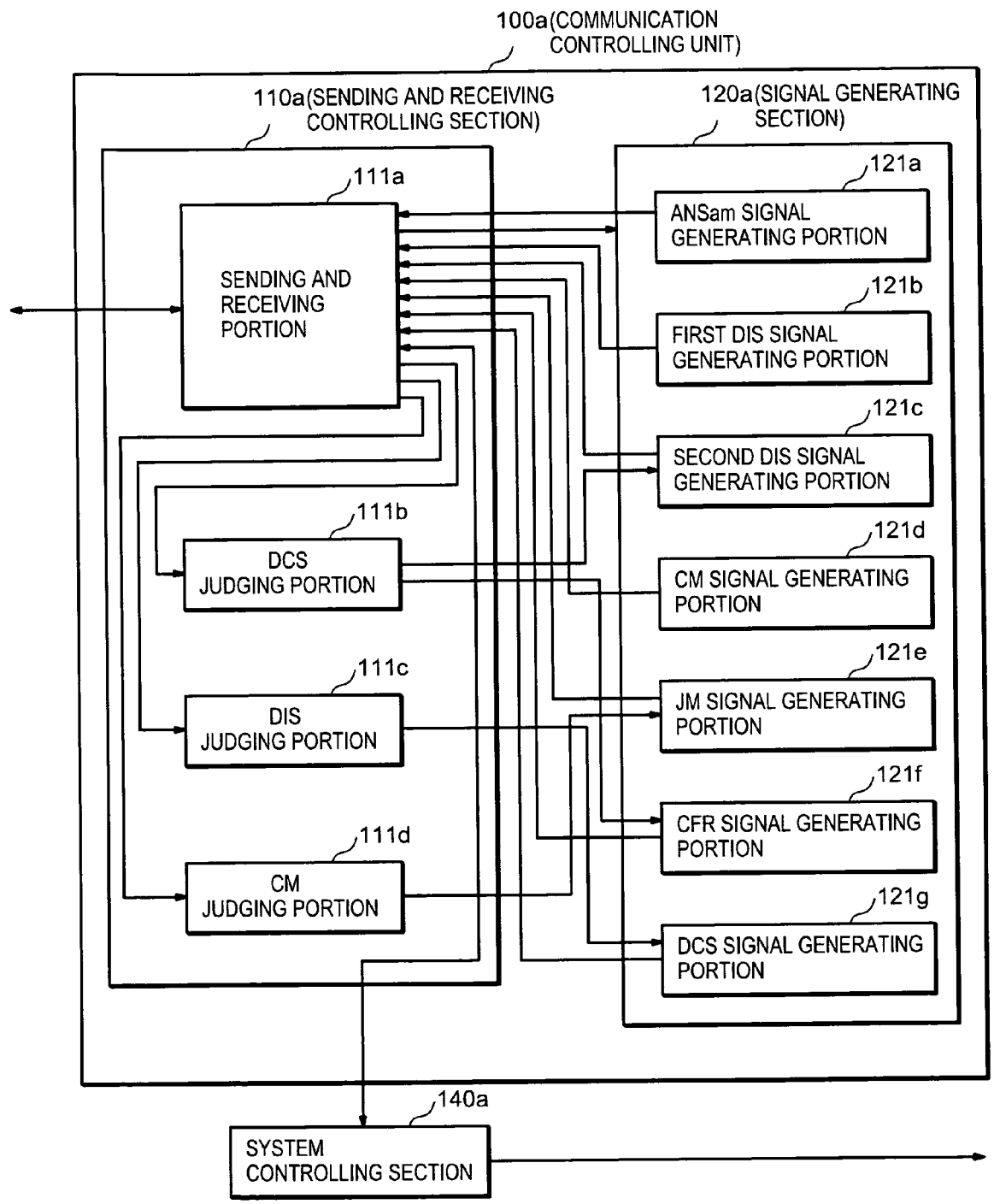
FIG. 14 is a function block diagram of a communicating apparatus in embodiment 2 related to the present invention.

The CPU 11 generates a communication controlling unit 100a as shown by FIG. 14, which has a function mentioned below and a system controlling section 140a which has the same function as that in embodiment 1 through executing communication control program and system control program that are stored in the ROM 2.

The communication controlling unit 100a, as stated in the embodiment 1, is a part to execute facsimile transmission control process according to ITU-T recommendation T.30, it comprises a sending and receiving controlling section 110a and a signal generating section 120.

A sending and receiving portion 111a sends ANSam signal, CM signal, JM signal, first DIS signal, second DIS signal, DCS signal, CFR signal that are generated by the signal generating section 120 and image data to partner facsimile apparatus (herein after: communicating apparatus) and receives such information from partner communicating apparatus.

Here, the ANSam signal is a signal represents to use a modem regulated by V.8 recommendation in V series recommended by ITU-T. The CM signal is a signal which notifies that communication based on the V.8 recommendation is performed, the JM signal is a signal which notifies that communication process based on the V.8 recommendation in the V series recommended by the ITU-T, is performed. Here, in the V.8 recommendation, a modulation method used for modem is regulated, in V.34 recommendation, it is described that communication speed is 33.6 kbit/s; a communication method is a 2-wire system in full duplex type; and the like.

A DCS judging portion 111b and a DIS judging portion 111c are the same as a DCS judging portion 112 and a DIS judging portion 113 in embodiment 1, respectively.

A CM judging portion 111d judges whether CM signal is sent from sending side communicating apparatus or not, as a result, in the case that the CM judging portion 111d judges that the CM signal is sent from the sending side communicating apparatus, outputs an execution request of V.8 sequence process, that is, a request to be modulated and demodulated by a modulation method based on the V.8 recommendation to the modem 6 via sending and receiving portion 111a. Further, the CM judging portion 111d outputs a request to generate JM signal which notifies of execution of communication process based on the V.34 recommendation to a JM signal generating portion 121e in the signal generating section 120a.

The signal generating section 120a consists of an ANSam signal generating portion 121a which generates ANSam signal and outputs the ANSam signal to the sending and receiving portion 111a; a first DIS signal generating portion 121b which generates first DIS signal and outputs the first DIS signal to the sending and receiving portion 111a; a second DIS signal generating portion 121c which generates second DIS signal and outputs the second DIS signal to the sending and receiving portion 111a; a CM signal generating portion 121d which generates CM signal and outputs the CM signal to the sending and receiving portion 111a; a JM signal generating portion 121e which generates JM signal and outputs the JM signal to the sending and receiving portion 111a; a CFR signal generating portion 121f which generates CFR signal and outputs the CFR signal to the sending and receiving portion 111a; and a DCS signal generating portion 121g which generates DCS signal and outputs the DCS signal to the sending and receiving portion 111a.

Moreover, regarding timing related to generation of these signals, it will be explained in explanation of an operation of the communicating apparatus related to embodiment 2.

In the case that the self apparatus is a sending side apparatus, the CM signal generating portion 121d and the DCS signal generating portion 121g function. In the case that the self apparatus is a receiving side apparatus, the ANSam signal generating portion 121a, the first DIS signal generating portion 121b, the second DIS signal generating portion 121c, the JM signal generating portion 121e and the CFR signal generating portion 121f function.

Next, an operation of a communicating apparatus in embodiment 2 related to the present invention will be explained.

[A Case to Comprise a Communicating Apparatus Based on V.8 Recommendation and a Receiving Side Communicating Apparatus Related to the Present Embodiment and Based on V.8 Recommendation]

Figure 15:
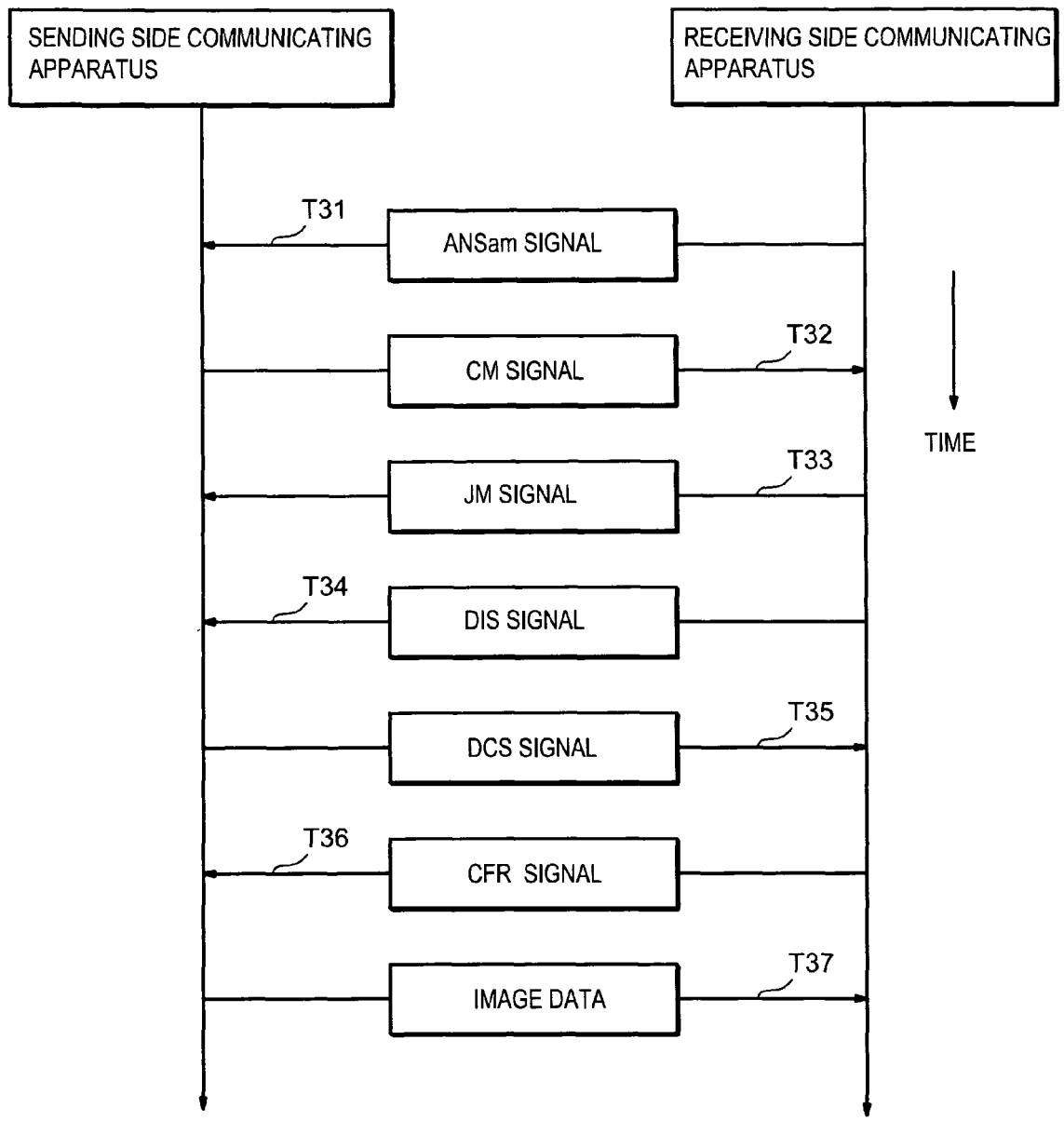
FIG. 15 is a sequence diagram for showing a transmission control sequence of a communicating apparatus in embodiment 2 related to the present invention.

FIG. 15 is a sequence diagram for showing a transmission control sequence of a communicating apparatus in embodiment 2 related to the present embodiment. Here, the sending side communicating apparatus in FIG. 15 is a communicating apparatus which has a function regulated by the V.8 recommendation; and the receiving side communicating apparatus is a communicating apparatus which has a function regulated by the V.8 recommendation together with having a structure related to embodiment 2 of the present invention.

The receiving side communicating apparatus, when communicatively connected with the sending side communicating apparatus via telephone line, sends ANSam signal which is regulated by the V.8 recommendation in the V series recommended by ITU-T to the sending side communicating apparatus via PSTN 30 (refer to T31 in FIG. 15).

The sending side communicating apparatus, when the ANSam signal is sent via PSTN 30, sends CM signal which notifies that it is an apparatus to execute the V.8 recommendation and it performs communication on the basis of the V.8 recommendation to the receiving side communicating apparatus via PSTN 30 (refer to T32 in FIG. 15).

The receiving side communicating apparatus, when the CM signal is sent, sends JM signal whose communication speed is 33.6 kbit/s; and which notifies that communication process is executed according to V.34 recommendation which regulates communication process in a full duplex modem of 2-wire system to the receiving side communicating apparatus via PSTN 30 (refer to T33 in FIG. 15).

After that, the receiving side communicating apparatus shifts a process to T.30 phase of control channel in V.34 mode communication; and sends DIS signal which notifies of communication capability function regulated by the V.34 recommendation as communication capability supported by the self apparatus to the sending side communicating apparatus via PSTN 30 (refer to T34 in FIG. 15).

The sending side communicating apparatus, when the DIS signal is sent from the receiving side communicating apparatus, sends DCS signal which notifies of communication capability regulated by the V.34 recommendation as communication capability supported by the self apparatus to the receiving side communicating apparatus via PSTN 30 (refer to T35 in FIG. 15).

After that, the receiving side communicating apparatus sends CFR signal which represents that it has been confirmed to execute communication process in the communication capability specified by the DCS signal to the sending side communicating apparatus via PSTN 30 (refer to T36 in FIG. 15).

The sending side communicating apparatus, when the CFR signal is sent from the receiving side communicating apparatus, sequentially reads image data formed from dot image data which is stored in the RAM 3. Further, the sending side communication apparatus codes the image data; and sends the coded image data to the receiving side communicating apparatus via PSTN 30 (refer to T37 in FIG. 15).

Figure 16:
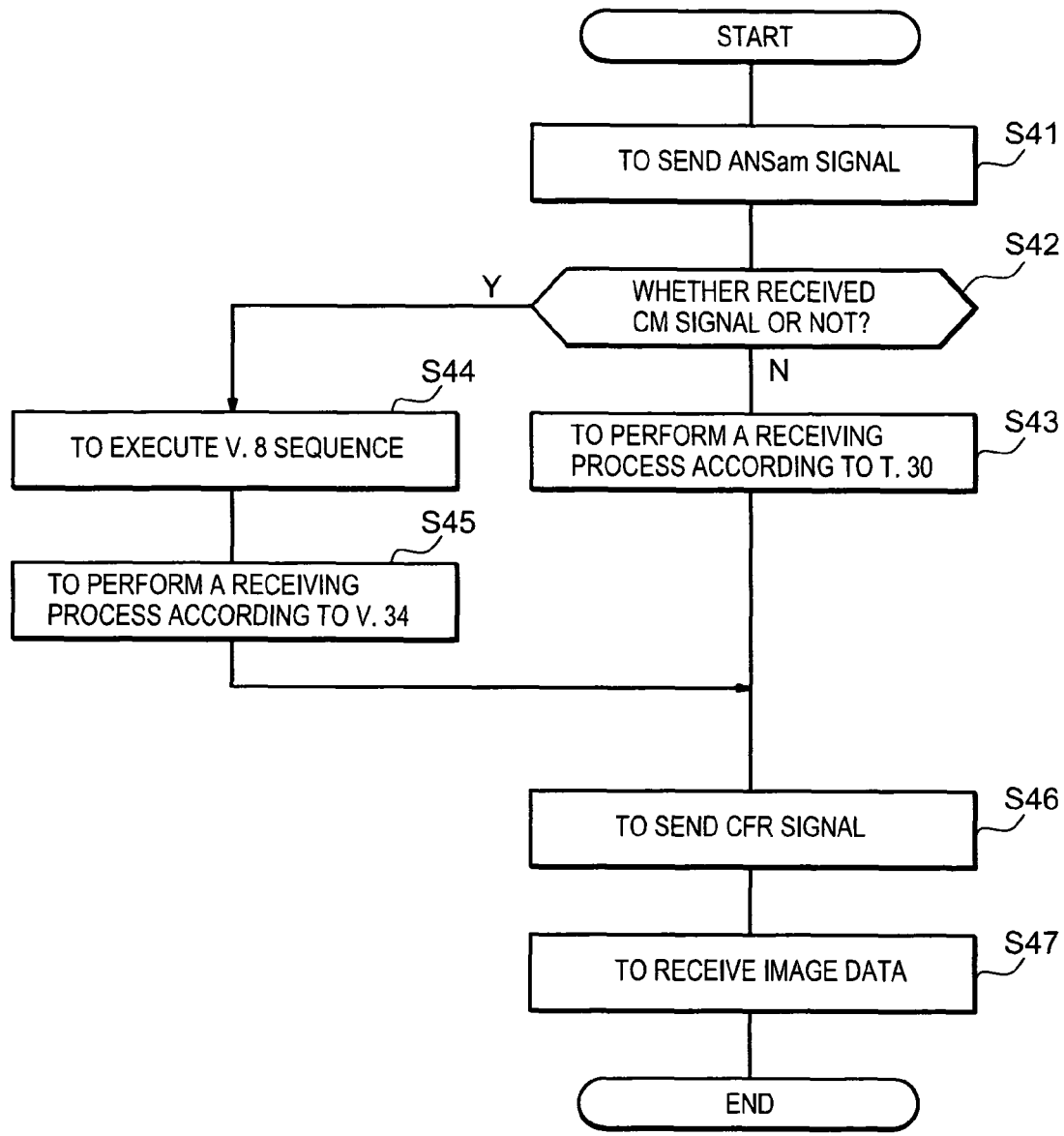
FIG. 16 is a flowchart for explaining operation of a receiving side communicating apparatus in embodiment 2 related to the present invention.

FIG. 16 is a flowchart for explaining operation of a receiving side communicating apparatus in embodiment 2 related to the present invention. When the receiving side communicating apparatus is communicatively connected with the sending side communicating apparatus via telephone line, the sending and receiving portion 111*a* outputs a notification representing the connection to the signal generating section 120*a*.

The ANSam signal generating portion 121*a* in the signal generating section 120*a*, when the notification is inputted, generates ANSam signal which is regulated by the V.8 recommendation in the V series recommended by ITU-T; and outputs the generated ANSam signal to the sending and receiving portion 111*a* in the sending and receiving controlling section 110*a*.

The sending and receiving portion 111*a*, when the ANSam signal is inputted by the ANSam signal generating portion 121*a*, outputs the inputted ANSam signal to the modem 6.

The modem 6, the ANSam signal is inputted, generates ANSam signal formed from analog data; and outputs it to the NCU 8.

The NCU 8 sends the ANSam signal which is inputted by the modem 6 to the sending side communicating apparatus via PSTN 30 (Step S41).

After that, the CM judging portion 111*d* in the sending and receiving controlling section 110*a* judges whether CM signal which notifies that communication based on the V.8 recommendation is executed, is sent from the sending side communicating apparatus via PSTN 30 or not (Step S42). In the case that the CM judging portion 111*d* judges that the CM signal is sent from the sending side communicating apparatus (Step S42; Yes), the CM judging portion 111*d* outputs an execution request of V.8 sequence process, that is, a request to be modulated and demodulated by a modulation method based on the V.8 recommendation to the modem 6 via sending and receiving portion 111*a*. By this, the modem 6 modulates and demodulates signal by the modulation method based on the V.8 recommendation (Step S44).

After that, the CM judging portion 111*d* outputs a request to generate JM signal to the JM signal generating portion 121*e* in the signal generating section 120*a* in order to shift a process to communication process based on the V.34 recommendation in the V series recommended by the ITU-T.

The JM signal generating portion 121*e*, when the request is inputted, generates JM signal; and outputs the JM signal to the sending and receiving portion 111*a*.

The sending and receiving portion 111*a*, when the JM signal is inputted by the JM signal generating portion, outputs the JM signal to the modem 6.

The modem 6, when the JM signal is inputted by the sending and receiving portion 111*a*, generates JM signal formed from analog data; and outputs it to the NCU 8.

The NCU 8 connects the PSTN 30 with line of the modem 6; and sends the JM signal which is inputted by the modem 6 to the sending side communicating apparatus via PSTN 30 (Step S44). Next, in the T.30 phase of the control channel in the V.34 mode communication, the receiving side communicating apparatus sends and receives DIS signal and DCS signal between the self apparatus and the sending side communicating apparatus (Step S45), then, a process is shifted to Step S46.

In Step S42, in the case that the CM judging portion 111*d* judges that the CM signal is not sent from the sending side communication apparatus (Step S42; No), the CM judging portion 111*d* outputs a request to execute receiving process based on recommendation T.30 to the first DIS signal generating portion 121*b* in the signal generating section 120*a*.

The first DIS signal generating portion 121*b*, when the request is inputted by the CM judging portion 111*d*, generates first DIS signal, after that, the same process as that in embodiment 1 is executed.

After receiving process by the recommendation T.30 is finished, then, the DCS judging portion 111*b*, when DCS signal is inputted via sending and receiving portion 111*a*, outputs a request to generate CFR signal to the CFR signal generating portion 121*f* in the signal generating section 120*a*.

The CFR signal generating portion 121*f*, when the request is inputted, generates CFR signal which represents that it has been confirmed to execute communication process in the communication capability specified by the DCS signal; and outputs the generated CFR signal to the sending and receiving portion 111*a*.

After that, the sending and receiving portion 111*a* outputs the CFR signal which inputted by the CFR signal generating portion 121*f* to the modem 6.

The modem 6, when the CFR signal is inputted by the sending and receiving portion 111a, generates CFR signal formed from analog data; and outputs it to the NCU 8.

The NCU 8 connects the PSTN 30 with line of the modem 6; and sends the CFR signal which is inputted by the modem 6 to the sending side communicating apparatus via PSTN 30 (Step S46).

After that, the modem 6 changes image which is inputted one after another from the sending side communicating apparatus into image data formed from digital data; and outputs the image data to the sending and receiving portion 111a.

The sending and receiving portion 111a temporarily stores the image data which is inputted one after another by the modem 6 into the RAM 3; outputs a notification that the image data is inputted to the system controlling section 140a; then, the process is finished.

Moreover, the system controlling section 140a, when the notification is inputted, outputs an instruction to request print start with respect to the printing apparatus 5.

The printing apparatus 5, when the instruction is inputted by the system controlling section 140a which is generated by the CPU 1, reads out the image data stored in the RAM 3 one after another; restores the image data; and prints out them on a printing medium.

[A Case to Comprise a Communicating Apparatus Un-Based on the V.8 Recommendation and a Receiving Side Communicating Apparatus Related to the Present Embodiment]

Figure 17:
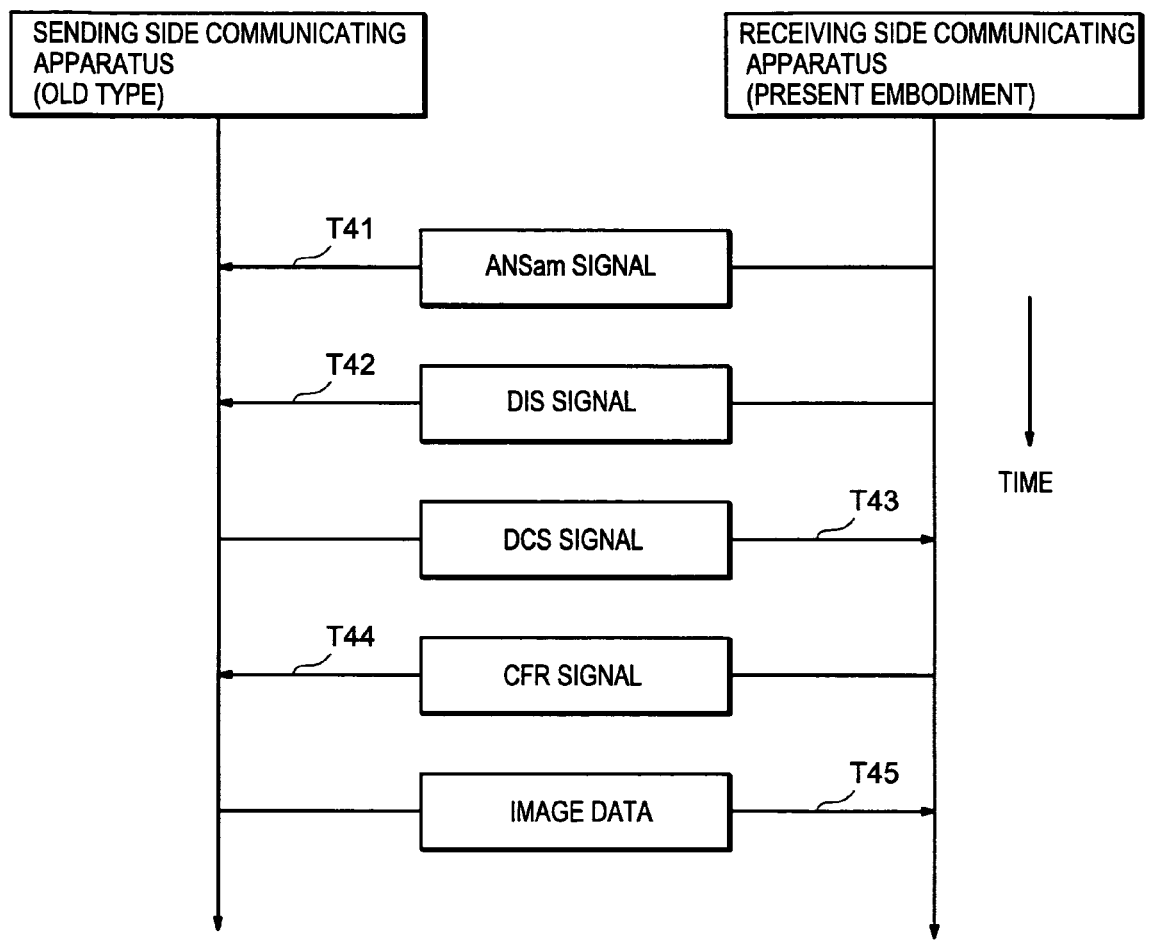
FIG. 17 is a sequence diagram for showing a transmission control sequence of a communicating apparatus in embodiment 2 related to the present invention.

FIG. 17 is a sequence diagram for showing a transmission control sequence of a communicating apparatus in embodiment 2 related to the present invention. Here, the sending side communicating apparatus in FIG. 17 is a communicating apparatus which does not have ITU-V.8; and the receiving side communicating apparatus is a communicating apparatus which has a structure of embodiment 2 related to the present invention.

When the sending side communicating apparatus and the receiving side communicating apparatus are communicatively connected with each other via telephone line, in the case that the receiving side communicating apparatus receives ring signal, sends ANSam signal to the sending side communicating apparatus via PSTN 30 (refer to T41 in FIG. 17).

Even if the ANSam signal is sent via PSTN 30, the sending side communicating apparatus cannot send CM signal with respect to the ANSam signal to the receiving side communicating apparatus because the self apparatus does not satisfy V.8 recommendation.

In the case that the receiving side communicating apparatus does not receive CM signal from the sending side communicating apparatus after a predetermined time is passed, the receiving side communicating apparatus specifies that the sending side communicating apparatus is a communicating apparatus which does not satisfy the V.8 recommendation. Then, the receiving side communicating apparatus sends DIS signal which notifies of supportable communication capability of minimum limitation needed in all facsimile apparatus to the sending side communicating apparatus via PSTN 30 (refer to T42 in FIG. 17). After that, regarding the processes of the sending side communicating apparatus and the receiving side communicating apparatus (refer to T43, T44 and T45 in FIG. 17), they are performed as shown by FIG. 15.

Further, according to embodiment 2, after received connection request information from sending side communicating apparatus, in the case that ANSam signal regulated by the V.8 recommendation is sent to sending apparatus; but the sending and receiving portion 111a does not receive CM signal with respect to the ANSam signal from the sending side communicating apparatus, it can specify that the sending side communicating apparatus is not an apparatus which follows the V.8 recommendation, that is, an old type communicating apparatus. And, because the sending and receiving portion 111a sends DIS signal which notifies of supportable communication capability of minimum limitation needed in all facsimile apparatus; and receives DCS signal which notifies of the communication capability notified by the DIS signal, it is possible to prevent communication error from occurring between self apparatus and the sending side communicating apparatus.

Further, according to embodiment 2, in the case that the sending and receiving portion 111a receives CM signal, because the sending and receiving portion 111a sends DIS signal which notifies communication capability based on the V.34 recommendation as communication capability supported by the self apparatus to the sending side communicating apparatus; and receives communication capability which is notified by the DIS signal, it is possible to maintain high communication capability between the self apparatus and the sending side communicating apparatus.

Furthermore, according to embodiment 2, because it is unnecessary to have hardware for specifying a sending telephone number, it is possible to reduce the cost of apparatus; and it is possible to eliminate dependence on exchange machine. The utilization possibility in industry In the above stated explanation, only such case is explained that the present embodiment is applied to a facsimile apparatus as a communicating apparatus. However, the present invention also can be applied to a communicating apparatus such as MPF (Multifunction Peripheral), facsimile modem and the like.

The present invention is not limited to the foregoing embodiments but many modifications and variations are possible within the spirit and scope of the appended claims of the invention.

What is claimed is:

1. A communicating apparatus, comprising:
   a receiving section for receiving signal from a partner apparatus;
   a receiving capability notification information making section for making a first DIS signal (Digital Identification Signal) having a predetermined bit number and a second DIS signal having a bit number more than the predetermined bit number; and
   a receiving controlling section for selecting and sending one of the first DIS signal and the second DIS signal in order to represent a receiving function of the communicating apparatus with respect to the partner apparatus,
   wherein the receiving controlling section sends the first DIS signal to said partner apparatus after receiving a connection request information signal to request a connection from the partner apparatus;
   after the first DIS signal is sent, if a DCS signal (Digital Command Signal) is not received from the partner apparatus within a first predetermined time, the communicating apparatus sends the second DIS signal to said partner apparatus; and
   in the case that the second DIS signal is supported, the communicating apparatus does not output the DCS signal corresponding to the received first DIS signal, whereas the communicating apparatus outputs the DCS signal corresponding to the received second DIS signal.

2. The communicating apparatus according to claim 1, wherein the receiving controlling section, when received the DCS signal from the partner apparatus with respect to the first DIS signal, performs communication in function represented by the DCS signal.

3. The communicating apparatus according to claim 1, wherein the receiving controlling section, when received the DCS signal from partner apparatus with respect to the second DIS signal, performs communication in function represented by the DCS signal.

4. The communicating apparatus according to claim 1, wherein the receiving controlling section, in the case to send ANSam signal to partner apparatus according to an order of ITU-V.8 with respect to the connection request information signal; and to receive a CM signal from partner apparatus, sends a DIS signal representing a receiving function of ITU-V.34 to said partner apparatus; in the case that the CM signal is not received, sends the first DIS signal to said partner apparatus; in the case the DCS signal is not received from partner apparatus within a predetermined time, sends the second DIS signal to said partner apparatus.

5. A communicating apparatus, comprising:
a receiving section for receiving a DIS signal (Digital Identification Signal) representing receiving function from a partner apparatus with respect to a connection request information signal to request to connect with the communicating apparatus;
a judging section for judging whether or not a bit number of the DIS signal received by the receiving section, is more than a predetermined bit number; and
a sending controlling section to control sending a DCS signal (Digital Command Signal) representing function of the communicating apparatus with respect to the partner apparatus to correspond to said DIS signal,
wherein the sending controlling section, in the case that the bit number of the DIS signal which is firstly received after sending the connection request information, is more than the predetermined bit number, sends a DCS signal representing function corresponding to the DIS signal to said partner apparatus;
in the case that bit number of the DIS signal which is firstly received after sending the connection request information signal, is equal to the predetermined bit number, waits to receive the first DIS signal till a first predetermined time is passed without sending DCS signal, then, sends the DCS signal representing function corresponding to the first DIS signal to said partner apparatus, and
wherein the sending controlling section, after receiving a first DIS signal, ignores a response within a second predetermined time; and if second DIS signal is received, sends the sending DCS signal according to the received second DIS signal; and
in the case that the second DIS signal is supported, the communicating apparatus does not output the DCS signal corresponding to the received first DIS signal, whereas the communicating apparatus outputs the DCS signal corresponding to the received second DIS signal.

6. A communicating system that includes a sending apparatus and a receiving apparatus comprising:
said sending apparatus that includes:
a first receiving section for receiving a DIS signal (Digital Identification Signal) which represents a receiving function from said receiving apparatus with respect to connection request information signal to request to connect with said sending apparatus;
a judging section for judging whether or not a bit number of the DIS signal received by the first receiving section, is more than a predetermined bit number; and
a sending controlling section for controlling to send a DCS signal (Digital Command Signal) representing a function of said sending apparatus with respect to said receiving apparatus to correspond to said DIS signal; and
said receiving apparatus that includes:
a second receiving section for receiving signal from said sending apparatus;
a receiving capability notification information making section for making a first DIS signal having a predetermined bit number and a second DIS signal having a bit number more than the predetermined bit number; and
a receiving controlling section for selecting and sending one of the first DIS signal and the second DIS signal in order to represent a receiving function of said receiving apparatus with respect to said sending apparatus,
wherein the receiving controlling section sends the first DIS signal to said sending apparatus after receiving the connection request information signal to request to connect from said sending apparatus; after the first receiving capability notification information is sent, in the case sending communication capability notification information is not received from said sending apparatus within a first predetermined time, the receiving apparatus sends the second DIS signal to said sending apparatus;
wherein the sending controlling section, after the first DIS signal is received from said receiving apparatus after sending the connection request information signal, waits to receive the DIS signal till a second predetermined time is passed without sending the DCS signal; and
in the case the second DIS signal is received, the sending apparatus sends the DCS signal representing a function corresponding to the second DIS signal to the receiving apparatus; and
in the case that the second DIS signal is supported, the communicating system does not output the DCS signal corresponding to the received first DIS signal, whereas the communicating system outputs the DCS signal corresponding to the received second DIS signal.

* * * * *